US008515879B2

(12) United States Patent
Huh et al.

(10) Patent No.: US 8,515,879 B2
(45) Date of Patent: Aug. 20, 2013

(54) SUPERVISED NONNEGATIVE MATRIX FACTORIZATION

(75) Inventors: Seung-il Huh, Pittsburgh, PA (US); Mithun Das Gupta, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 425 days.

(21) Appl. No.: 12/854,776

(22) Filed: Aug. 11, 2010

(65) Prior Publication Data
US 2012/0041906 A1 Feb. 16, 2012

(51) Int. Cl.
G06F 15/18 (2006.01)
G06F 17/11 (2006.01)

(52) U.S. Cl.
USPC ............................................. 706/12; 708/207

(58) Field of Classification Search
None
See application file for complete search history.

(56) References Cited

U.S. PATENT DOCUMENTS

| | | | |
|---|---|---|---|
| 6,584,223 | B1 | 6/2003 | Shiiyama |
| 7,519,200 | B2 | 4/2009 | Gokturk et al. |
| 2003/0041041 | A1 | 2/2003 | Cristianini |
| 2006/0136462 | A1 | 6/2006 | Campos et al. |
| 2008/0291122 | A1 | 11/2008 | Smith et al. |
| 2009/0080666 | A1 | 3/2009 | Uhle et al. |
| 2009/0132901 | A1 | 5/2009 | Zhu et al. |
| 2009/0287624 | A1 | 11/2009 | Rouat et al. |

OTHER PUBLICATIONS

Sastry, Mohideen, "Modified Algorithm to Compute Pareto-Optimal Vectors", Journal of Optimization, Theory and Applicaitons, Vold 103, No. 1, Oct. 1999, pp. 241-244.*
Zafeiriou, Petrou, "Nonlinear Non-negative Component Analysis Algorithms", IEEE Transactions on Image Processing, Apr. 2010, pp. 1050-1066.*
He, "Incremental Semi-supervised Subspace Learning for Image Retrieval," Proceedings of the 12th Annual ACM International Conferene on Multimedia, 2004, pp. 2-8.*
Wang, Yan, Xu, Tang, Huang, "Trace Ratio vs. Ratio Trace for Dimensionality Reduction," 2007 IEEE Conferernce on Computer Vision and Pattern Recognition, 2007, pp. 1-8.*
Yang, Yang, Fu, Li, Huang, "Non-negative Graph Embedding", IEEE Conference on Computer Vision and Pattern Recognition 2008, CVPR 2008, 2008, pp. 1-8.*
Brunet, J.P., et al., "Metagenes and Molecular Pattern Discovery Using Matrix Factorization", National Academy of Sciences, 102(12): pp. 4164-4169, 2004.
Buciu, I., et al., "Non-negative matrix factorization in polynomial feature space", IEEE Transactions on Neural Networks, 19(6): 2008.
Cai, D., et al., "Non-negative Matrix Factorization on Manifold", ICDM, 2008.
Cooper, M., et al., "Summarizing Video using Non-Negative Similarity Matrix Factorization", IEEE Workshop on Multimedia Signal Processing, pp. 25-28, 2002.

(Continued)

Primary Examiner — Kakali Chaki
Assistant Examiner — Walter Hanchak

(57) ABSTRACT

Supervised kernel nonnegative matrix factorization generates a descriptive part-based representation of data, based on the concept of kernel nonnegative matrix factorization (kernel NMF) aided by the discriminative concept of graph embedding. An iterative procedure that optimizes suggested formulation based on Pareto optimization is presented. The present formulation removes any dependence on combined optimization schemes.

18 Claims, 11 Drawing Sheets

(56) References Cited

OTHER PUBLICATIONS

Xu, Yan, Tao, Lin, Zhang, "Marginal Fisher Analysis and Its Variants for Human Gait Recognition and Content-Based Image Retrieval", IEEE Transactions on Image Processing, vol. 16, No. 11, Nov. 2007, pp. 2811-2821.*

Kim, J., et al., "Toward Faster Nonnegative Matrix Factorization: A New Algorithm and Comparisons", In ICDM, pp. 353-362, 2008.

Sha, F., et al., "Multiplicative Updates for Nonnegative Quadratic Programming in Support Vector Machines", In NIPS, 2003.

Lee, D.D., et al., "Learning the parts of objects by nonnegative matrix factorization", Nature 401: 788-791, 1999.

Lee, D.D., et al., Algorithms for Non-negative Matrix Factorization, NIPS, pp. 556-562, 2000.

Li, S. Z., et al., "Learning Spatially Localized, Parts-Based Representation", in CVPR, pp. 207-212, 2001.

Lin, C.-J., "On the Convergence of Multiplicative Update Algorithms for Non-negative Matrix Factorization", IEEE Transactions on Neural Networks, pp. 1589-1596, 2007.

Lin, C.-J., "Projected gradient methods for non-negative matrix factorization", Neural Computation, 19(10): pp. 2756-2779, 2007.

Wang, C., et al., "Multiplicative Nonnegative Graph Embedding", in CVPR, 2009.

Wang, Y., et al., "Non-Negative Matrix Factorization Framework for Face Recognition", International Journal of Pattern Recognition and Artificial Intelligence, 19(4): 495-511, 2005.

Wang, Y., et al., "Fisher Non-Negative Matrix Factorization for Learning Local Features", in ACCV, 2004.

Xu, Dong, et al., "Marginal Fisher Analysis and its Variants for Human Gait Recognition and Content-Based Image Retrieval", IEEE Trans. on Image Processing, 16(11), 2007.

Xu, W., et al., "Document Clustering Based on Non-negative Matrix Factorization", SIGIR, ACM Conference, pp. 267-273, 2003.

Yang, J., et al., "Non-Negative Graph Embedding", in CVPR 2008.

Zafeiriou, S., et al., "Nonlinear Nonnegative Component Analysis", CVPR, pp. 2860-2865, 2009.

Duda, R., et al., "Pattern Classification, Second Edition, pp. 215-281, Linear Discriminant Functions", 2006.

* cited by examiner

FIG. 3B

(Continued from FIG. 3A)

↓

Define iterative updates of $V$ and $X$ to solve the optimization problem of $F^{(1)}(\phi V, X)$ assuming no graph embedding $$\min_{V,X} \; \|\phi(U)-\phi(V)X\|_F^2 \quad s.t. \; V_{ik} \geq 0 \text{ and } X_{kj} \geq 0 \quad \forall i, j, \text{ and } k$$

wherein the iterative updates are of the form:

$V_{ij} \leftarrow V_{ij}$ multiplied by $(\eta)$   and   $X_{ij} \leftarrow X_{ij}$ multiplied by $\left(T_{ij}^{(1)}\right)$ where $\eta$ and $T_{ij}^{(1)}$ represent appropriate solution formulations for the above system assuming no graph embedding

⟵ S53

↓ let $\quad \lambda = F^{(2)}(X)$  ⟵ S54

↓

Let $\quad T_{ij}^{(2)} = \dfrac{(X(L - \lambda \overline{L})^-)_{ij}}{(X(L - \lambda \overline{L})^+)_{ij}}$  ⟵ S56

↓ let matrix $(L - \lambda \overline{L})^+$ be defined as $(L - \lambda \overline{L})^+ = A^+ = [A_{ij}^+]$ and $$A_{ij}^+ = \begin{cases} A_{ij} & \text{if } A_{ij} > 0 \\ 0 & \text{otherwise} \end{cases}$$

⟵ S57

↓ let matrix $(L - \lambda \overline{L})^-$ be defined as $(L - \lambda \overline{L})^- = A^- = [A_{ij}^-]$ and $$A_{ij}^- = \begin{cases} -A_{ij} & \text{if } A_{ij} < 0 \\ 0 & \text{otherwise} \end{cases};$$

⟵ S58

↓

Combine the objectives of kernel NMF and Graph embedding by applying the following updates until a Pareto optimal is reached, i.e. until a stationary point is reached $V_{ij} \leftarrow V_{ij} \cdot (\eta)$   and   $X_{ij} \leftarrow X_{ij} \cdot h\left(T_{ij}^{(1)}, T_{ij}^{(2)}\right)$ where $\quad h(a,b) = \begin{cases} \min(a,b) & \text{if } a > 1 \text{ and } b > 1 \\ \max(a,b) & \text{if } a < 1 \text{ and } b < 1 \\ 1 & \text{otherwise} \end{cases}$

STEPS S40 to S52

Given: $\min_{V,X} \|\phi(U)-\phi(V)X\|_F^2$   s.t. $V_{ik} \geq 0$ and $X_{kj} \geq 0$  $\forall i,j,$ and $k$ For a polynomial kernal, an iterative solution for the above optimization system, assuming no graph embedding, is $$V_{ij} \leftarrow V_{ij}\left(\frac{\left(UK'^{(UV)}\right)_{ij}}{\left(V\Omega K'^{(VV)}\right)_{ij}}\right) \text{ and } X_{ij} \leftarrow X_{ij}\left(\frac{K_{ij}^{(VU)}}{\left(K^{(VV)}X\right)_{ij}}\right)$$

where:

$K^{(VU)}$ is a kernel matrix whose $(i,j)$ element is $\phi(v_i)\cdot\phi(u_j) = (v_i \cdot u_j)^d$, where $d$ is the degree of the polynomial kernel, $K_{ij}^{(VV)} = \phi(v_i)\cdot\phi(v_j) = (v_i \cdot v_j)^d$, where $d$ is the degree of the polynomial kernel, $K'$ denotes the matrix containing the values of the derivative of the polynomial kernel function, such that $K_{ij}'^{(UV)} = d\cdot(u_i\cdot v_j)^{d-1}$ and $K_{ij}'^{(VV)} = d\cdot(v_i\cdot v_j)^{d-1}$, and $\Omega$ is a diagonal matrix whose diagonal elements are $\omega_{ii} = \sum_{j=1}^n X_{ij}$.

S71

S73  let  $T_{ij}^{(1)} = \dfrac{K_{ij}^{(VU)}}{\left(K^{(VV)}X\right)_{ij}}$

S75  Let  $T_{ij}^{(2)} = \dfrac{(X(L-\lambda\bar{L})^-)_{ij}}{(X(L-\lambda\bar{L})^+)_{ij}}$ S77  Combine the objectives of polynomial kernel NMF and Graph embedding by applying the following updates until a Pareto optimal is reached $$V_{ij} \leftarrow V_{ij}\left(\frac{\left(UK'^{(UV)}\right)_{ij}}{\left(V\Omega K'^{(VV)}\right)_{ij}}\right) \text{ and } X_{ij} \leftarrow X_{ij}\cdot h\left(T_{ij}^{(1)}, T_{ij}^{(2)}\right)$$

where  $h(a,b) = \begin{cases} \min(a,b) & \text{if } a > 1 \text{ and } b > 1 \\ \max(a,b) & \text{if } a < 1 \text{ and } b < 1 \\ 1 & \text{otherwise} \end{cases}$

FIG. 5

STEPS S40 to S52

Given an optimization problem:
$$\min_{V,X} \|\phi(U)-\phi(V)X\|_F^2 \quad s.t. \quad V_{ik} \geq 0 \text{ and } X_{kj} \geq 0 \quad \forall i,j, \text{ and } k$$
where every $\phi(v_j)$ is a linear combination of all the elements of $\phi(U)$ defined as
$\phi(v_j) = \sum_{i=1}^n Z_{ij}\phi(u_i)$, reformulated the optimization problem as $\min_{Z,X} \|\phi(U)-\phi(U)ZX\|_F^2$
s.t. $Z_{ik} \geq 0$ and $X_{kj} \geq 0$ $\forall i,j,$ and $k$, where $\|\cdot\|_F$ denotes the Frobenius norm.

An iterative solution (assuming no graph embedding) for the reformulated optimization problem is $$Z_{ij} \leftarrow Z_{ij}\left(\frac{\left(K^{(UU)}X\right)_{ij}}{\left(K^{(UU)}ZXX^T\right)_{ij}}\right), \quad X_{ij} \leftarrow X_{ij}\left(\frac{\left(Z^T K^{(UU)}\right)_{ij}}{\left(Z^T K^{(XX)}ZX\right)_{ij}}\right)$$

$K^{(UU)}$ is a kernel matrix whose $(i,j)$ element is $\phi(u_i)\cdot\phi(u_j) = (u_i\cdot u_j)^d$, where $d$ is the degree of the polynomial kernel,
$K_{ij}^{(XX)} = \phi(x_i)\cdot\phi(x_j) = (x_i\cdot x_j)^d$ where $d$ is the degree of the polynomial kernel

— S81

S83: let $T_{ij}^{(1)} = \dfrac{\left(Z^T K^{(UU)}\right)_{ij}}{\left(Z^T K^{(XX)}ZX\right)_{ij}}$ S85: Let $T_{ij}^{(2)} = \dfrac{(X(L-\lambda\overline{L})^-)_{ij}}{(X(L-\lambda\overline{L})^+)_{ij}}$ S87: $Z_{ij} \leftarrow Z_{ij} \cdot \left(\dfrac{\left(K^{(UU)}X\right)_{ij}}{\left(K^{(UU)}ZXX^T\right)_{ij}}\right), \quad X_{ij} \leftarrow X_{ij} \cdot h\left(T_{ij}^{(1)}, T_{ij}^{(2)}\right)$ where $h(a,b) = \begin{cases} \min(a,b) & \text{if } a > 1 \text{ and } b > 1 \\ \max(a,b) & \text{if } a < 1 \text{ and } b < 1 \\ 1 & \text{otherwise} \end{cases}$

TABLE 1

| Algorithm | FERET | JAFFE |
|---|---|---|
| PCA | 79.33 ± 3.40 | 63.65 ± 3.98 |
| ICA | 83.86 ± 3.57 | 66.35 ± 3.24 |
| NMF | 87.76 ± 3.09 | 64.92 ± 3.85 |
| LNMF | 84.24 ± 3.50 | 66.51 ± 5.04 |
| LDA | 90.76 ± 3.15 | 72.70 ± 4.86 |
| MFA | 84.57 ± 5.25 | 72.38 ± 5.51 |
| NGE | 87.14 ± 3.30 | 68.25 ± 4.81 |
| SNMF | 91.48 ± 2.90 | 74.60 ± 5.22 |

Face recognition accuracies (%) of several approaches on FERET and JAFFE databases.

TABLE 2

| Algorithm | Accuracy | Algorithm | Accuracy |
|---|---|---|---|
| PCA | 17.53 ± 0.87 | LDA | 48.16 ± 1.68 |
| ICA | 68.84 ± 1.67 | MFA | 72.17 ± 1.97 |
| NMF | 66.01 ± 1.33 | NGE | 49.58 ± 1.71 |
| LNMF | 55.14 ± 2.07 | SNMF | 73.52 ± 1.58 |

SUPERVISED NONNEGATIVE MATRIX FACTORIZATION

CROSS REFERENCE TO RELATED APPLICATIONS

This application is related to U.S. Patent Application Ser. No. 12/854,781 entitled "Supervised Nonnegative Matrix Factorization", filed on the same day as the instant application, and U.S. patent application Ser. No. 12/854,768 entitled "Supervised Nonnegative Matrix Factorization" filed on the same day as the instant application. These related applications are hereby incorporated by reference for all purposes.

BACKGROUND

1. Field of Invention

The present invention relates to the field of matrix factorization. More specifically, it relates to the field of kernel nonnegative matrix factorization, kernel NMF, with incorporated data classification properties.

2. Description of Related Art

Nonnegative matrix factorization (NMF) has recently been used for various applications, such as face recognition, multimedia, text mining, and gene expression discovery. NMF is a part-based representation wherein nonnegative inputs are represented by additive combinations of nonnegative bases. The inherent nonnegativity constraint in NMF leads to improved physical interpretation compared to other factorization methods, such as Principal Component Analysis (PCA). Psychological and physiological evidence for part-based representations in the brain appear to support the advantage of NMF.

Interestingly, NMF does not explain the recognition capability of the brain since NMF and its variants have been designed not for classification but for reconstruction. The lack of classification capability is a natural consequence of the unsupervised factorization method that does not utilize relationships within the input entities, such as class labels.

Several approaches have been proposed for NMF to generate more descriptive features for classification and clustering tasks. For example, "Fisher Nonnegative Matrix Factorization", ACCV, 2004, by Y. Wang, Y. Jiar, C. Hu, and M. Turk, proposes incorporating the NMF cost function and the difference of the between-class scatter from the within-class scatter. However, the objective of this Fisher-NMF is not guaranteed to converge since it may not be a convex function. "Non-negative Matrix Factorization on Manifold", ICDM, 2008, by D. Cai, X. He, X. Wu, and J. Han proposes graph regularized NMF (GNMF), which appends the term representing the favorite relationships among feature vector pairs. But, GNMF is handicapped by not considering unfavorable relationships.

Recently, J. Yang, S. Yang, Y. Fu, X. Li, and T. Huang proposed "Non-negative graph embedding" (NGE), in CVPR, 2008. NGE resolved the previous problems by introducing the concept of complementary space so as to be widely considered the state-of-the-art. NGE, however, utilized the approximate formulation of graph embedding, and as a result, NGE is not effective enough for classification, particularly when intra-class variations are large. This limitation is highlighted in experimental results shown below.

In a general sense, all of these previous works tried to incorporate NMF with graph embedding, but none of them successfully adopted the original formulation of graph embedding because the incorporated optimization problem is intractable. In addition, all the works are limited in that they depend on suitable parameters which are not easy to be determined appropriately.

SUMMARY OF INVENTION

It is an object of the present invention to incorporate the discriminative properties of graph embedding into the flexibility of kernel nonnegative matrix factorization, kernel NMF.

Here is presented a method of factorizing a data matrix U file by supervised kernel nonnegative factorization, SNMF, including: (a) providing a data processing device to implement the following step: (b) accessing a kernel; (c) accessing said data matrix U from a data store, wherein data matrix U is defined as $U \in \mathbb{R}^{d \times n}$; (d) defining an intrinsic graph G, wherein $G=\{U,W\}$, each column of $U \in \mathbb{R}^{d \times n}$ represents a vertex, and each element of similarity matrix W measures the similarity between vertex pairs; (e) defining a penalty graph $\overline{G}$, wherein $\overline{G}=\{U,\overline{W}\}$ and each element of dissimilarity matrix $\overline{W}$ measures unfavorable relationships between said vertex pairs; (f) defining an intrinsic diagonal matrix D, wherein $D=[D_{ij}]$ and $$D_{ii} = \sum_{j=1}^{n} W_{ij};$$

(g) defining an intrinsic Laplacian matrix L, wherein $L=D-W$; (h) defining a penalty diagonal matrix $\overline{D}$, wherein $\overline{D}=[\overline{D}_{ij}]$ and $$\overline{D}_{ii} = \sum_{j=1}^{n} \overline{W}_{ij};$$

(i) defining a penalty Laplacian matrix $\overline{L}$, wherein $\overline{L}=\overline{D}-\overline{W}$; (j) transforming, i.e. kernelizing, data matrix U to different dimensinal matrix $\phi(U)$ by tranforming each column $u_i$ of data matrix U to a different dimensional space according to said kernel, wherein each transformed $u_i$ defines a corresponding column $\phi(u_i)$ in $\phi(U)$; (k) defining a kernelized basis matrix $\phi(V)$ corresponding to a basis matrix V transformed by said kernel, each column $\phi(v_i)$ in $\phi(V)$ corresponding to a transformed column $v_i$ in V; (l) defining $F^{(1)}(\phi V, X)=\|\phi(U)-\phi(V)X\|_F^2$ as an objective of NMF; (m) defining a measure of the compactness of intrinsic graph G by the weighted sum of squared distances defined as $$\sum_{i<j}^{n} W_{ij}\|x_i - x_j\|^2 = Tr(XLX^T);$$

(n) defining a measure of the separability of penalty graph $\overline{G}$ by the weighted sum of squared distances defined as $$\sum_{i<j}^{n} \overline{W}_{ij}\|x_i - x_j\|^2 = Tr(X\overline{L}X^T);$$

(o) defining $$F^{(2)}(X) = \frac{Tr(XLX^T)}{Tr(X\overline{L}X^T)}$$

as an objective of graph embedding; (p) defining iterative updates of V and X to solve the optimization problem define by $F^{(1)}(\phi V,X)$ assuming no graph embedding, the optimization problem having the form $$\min_{V,X}\|\phi(U) - \phi(V)X\|_F^2 \text{ s.t. } V_{ik} \geq 0 \text{ and } X_{kj} \geq 0 \; \forall \; i, j,$$

and k, and the iterative updates having the form $V_{ij} \leftarrow V_{ij}$ multiplied by $(\eta)$ and $X_{ij} \leftarrow X_{ij}$ multiplied by $(T_{ij}^{(1)})$, where and $\eta$ and $T_{ij}^{(1)}$ represent appropriate solution formulations for the system with no graph embedding; (q) defining $\lambda = F^{(2)}(X)$; (r) defining $$T_{ij}^{(2)} = \frac{(X(L-\lambda\overline{L})^-)_{ij}}{(X(L-\lambda\overline{L})^+)_{ij}};$$

and (s) applying the following iterative multiplicative updates until a Pareto optimal is reached $$V_{ij} \leftarrow V_{ij} \cdot (\eta) \text{ and } X_{ij} \leftarrow X_{ij} \cdot h(T_{ij}^{(1)}, T_{ij}^{(2)})$$

where $$h(a,b) = \begin{cases} \min(a,b) & \text{if } a > 1 \text{ and } b > 1 \\ \max(a,b) & \text{if } a < 1 \text{ and } b < 1 \\ 1 & \text{otherwise.} \end{cases}$$

Preferably step (r) includes the following sub-steps: defining matrix $(L-\lambda\overline{L})^+$ as $(L-\lambda\overline{L})^+ = A^+ = [A_{ij}^+]$, where $$A_{ij}^+ = \begin{cases} A_{ij} & \text{if } A_{ij} > 0 \\ 0 & \text{otherwise;} \end{cases}$$

and defining matrix $(L-\lambda\overline{L})^-$ as $(L-\lambda\overline{L})^- = A^- = [A_{ij}^-]$, where $$A_{ij}^- = \begin{cases} -A_{ij} & \text{if } A_{ij} < 0 \\ 0 & \text{otherwise.} \end{cases}$$

Also preferably, the different dimensional matrix $\phi(U)$ is of higher dimension than said data matrix U.

In a specific embodiment of the present invention, the kernel is a polynomial kernel, and in step (p), $$\eta = \frac{(UK'^{(UV)})_{ij}}{(V\Omega K'^{(VV)})_{ij}} \text{ and } T_{ij}^{(1)} = \frac{K_{ij}^{(VU)}}{(K^{(VV)}X)_{ij}}$$

where: $K^{(VU)}$ is a kernel matrix whose (i,j) element is $\phi(v_i)\cdot\phi(u_j) = (v_i\cdot u_j)^d$, where d is the degree of the polynomial kernel, $K_{ij}^{(VV)} = \phi(v_i)\cdot\phi(v_j) = (v_i\cdot v_j)^d$, where d is the degree of the polynomial kernel, K' denotes the matrix containing the values of the derivative of the polynomial kernel function, such that $K'_{ij}^{(UV)} = d\cdot(u_i\cdot v_j)^{d-1}$ and $K'_{ij}^{(VV)} = d\cdot(v_i\cdot v_j)^{d-1}$, and $\Omega$ is a diagonal matrix whose diagonal elements are $$\omega_{ii} = \sum_{j=1}^{n} X_{ij}.$$

In another embodiment of the present invention, in step (p), every $\phi(v_j)$ is defined as a linear combination of all the elements of $\phi(U)$ according to $$\phi(v_j) = \sum_{i=1}^{n} Z_{ij}\phi(u_i),$$

where $Z_{ij}$ is a weight applied to $\phi(u_i)$, and Z is a combination of weights applied to $\phi(U)$ to define $\phi(V)$ according to $\phi(V) = \phi(U)Z$; optimization problem $$\min_{V,X}\|\phi(U) - \phi(V)X\|_F^2$$

is made to incorporate the substitution $\phi(V) = \phi(U)Z$, and is reformulated as $$\min_{Z,X}\|\phi(U) - \phi(U)ZX\|_F^2$$

s.t. $Z_{ik} \geq 0$ and $X_{kj} \geq 0 \; \forall i,j$, and k
where $\|\cdot\|_F$ denotes the Frobenius norm; and using the reformulated optimization problem, $\eta$ and $\mu$ are redefined as:

$$Z_{ij} \leftarrow Z_{ij}(\eta), X_{ij} \leftarrow X_{ij}(\mu)$$

where $$\eta = \left(\frac{(K^{(UU)}X)_{ij}}{(K^{(UU)}ZXX^T)_{ij}}\right) \text{ and } T_{ij}^{(1)} = \left(\frac{(Z^T K^{(UU)})_{ij}}{(Z^T K^{(XX)}ZX)_{ij}}\right)$$

where $K^{(UU)}$ is a kernel matrix whose (i,j) element is $\phi(u_i)\cdot\phi(u_j) = (u_i\cdot u_j)^d$, and d is the degree of the polynomial kernel, and where $K_{ij}^{(XX)} = \phi(x_i)\cdot\phi(x_j) = (x_i\cdot x_j)^d$, and in step (s), the substitution $\phi(V) = \phi(U)Z$ is incorporated into said iterative multiplicative updates, redefining them as:

$$Z_{ij} \leftarrow Z_{ij} \cdot \left(\frac{(K^{(UU)}X)_{ij}}{(K^{(UU)}ZXX^T)_{ij}}\right), X_{ij} \leftarrow X_{ij} \cdot h(T_{ij}^{(1)}, T_{ij}^{(2)})$$

where $h(a,b) = \begin{cases} \min(a,b) & \text{if } a > 1 \text{ and } b > 1 \\ \max(a,b) & \text{if } a < 1 \text{ and } b < 1 \\ 1 & \text{otherwise.} \end{cases}$ In a preferred embodiment, data matrix U is comprised of n samples and each column of U represents a sample. In this embodiment, each of said samples is an image file.

It is also preferred that W and $\overline{W}$ be generated from true relationships among data pairs, and that these data pairs be class labels of data.

Also preferably, the ratio formation of $F^{(2)}(X)$ is handled without any transformation. Additionally, at least one of similarity matrix W or dissimilarity matrix $\overline{W}$ has negative values. However, $Tr(XLX^T)$ and $Tr(X\overline{L}X^T)$ are positive since they relate to distances.

It is presently preferred that Pareto optimality be applied directly on said ratio formulation of $F^{(2)}(X)$ in the absence of any weighed sum approximation.

The Pareto optimal is found through a series of Pareto improvement status update iterations defined as a change from a current status (V,X) to a new status (V',X') that achieves a Pareto improvement until said Pareto optimal is achieved, and a status update is a Pareto improvement if either of the following two conditions is satisfied:

$$F^{(1)}(V',X') < F^{(1)}(V,X) \text{ and } F^{(2)}(V',X') \leq F^{(2)}(V,X) \quad 1)$$

$$F^{(1)}(V',X') \leq F^{(1)}(V,X) \text{ and } F^{(2)}(V',X') < F^{(2)}(V,X) \quad 2)$$

and wherein a current status is a Pareto optimal (V*,X*) if there is no other status (V',X') such that a status update iteration from (V*,X*) to (V',X') is a Pareto improvement.

In the presently preferred implementation, the Pareto optimal is achieved when the iterative multiplicative updates reach a stationary point.

Also preferably, similarity matrix W and dissimilarity matrix $\overline{W}$ are defined by the concept of within-class and between-class distances of Linear Discriminant Analysis (LDA). Following this approach, similarity matrix $W=[W_{ij}]$ is defined as:

$$W_{ij} = \begin{cases} \frac{1}{n_C} & \text{if } y_i, y_j \in c \\ 0 & \text{otherwise} \end{cases}$$

wherein $y_i$ is a class label of the i-th sample, $y_j$ is a class label of the j-th sample, and $n_c$ is the size of class c ; and dissimilarity matrix $\overline{W}=[\overline{W}_{ij}]$ is defined as $$\overline{W}_{ij} = \frac{1}{n} - W_{ij}$$

wherein n is the number of data points.

A preferred embodiment for classifying test data, includes arranging a set of training data into data matrix U; applying the supervised kernel nonnegative factorization method of claim 1 to data matrix U to identify the coefficient matrix X* at the Pareto optimal state; and classifying said test data only according to the classification defined by X*.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 3A and 3B show a flowchart of a general method of supervised kernel NMF in accord with the present invention.

FIG. 4 is a flowchart of a preferred method of supervised polynomial kernel NMF.

FIG. 5 is a flowchart of a method of supervised kernel NMF using a substitution for basis matrix V.

DESCRIPTION OF THE PREFERRED EMBODIMENTS

Recently, Nonnegative Matrix Factorization (NMF) has received much attention due to its representative power for nonnegative data. The discriminative power of NMF, however, is limited by its inability to consider relationships present in data, such as class labels. Several works tried to address this issue by adopting the concept of graph embedding, albeit in an approximated form. Herein, Supervised NMF (i.e., SNMF) is proposed, which incorporates the objective function of graph embedding without any approximations, and which was previously deemed to be intractable. A novel way of separately considering the objective functions of NMF and graph embedding is presented. Also presented is a way of finding a Pareto optimum through iteratively searching for Pareto improvements. As a result, SNMF achieves higher classification performance since it does not compromise the full potential of graph embedding. Furthermore, SNMF is designed for computational efficiency, for no parameter tuning, for formulation flexibility, and for applicability to NMF variants. Empirical evidence demonstrates the success of SNMF in terms of robustness to variations as well as recognition accuracy compared to state-of-the-art techniques. Specific examples of the applicability to NMF variants, such as polynomial kernel NMF and supervised kernel NMF, are also presented.

The present supervised nonnegative matrix factorization (SNMF) is intended to achieve classification capability based on the benefits of the part-based representation of NMF. First of all, SNMF adopts the original formulation of graph embedding and solves a system of optimization problems through iteratively searching for a Pareto improvement. Generally, Pareto optimization is a concept in economics and game theory, but is herein applied to more effectively incorporate graph imbedding concepts to NMF.

Due to the effectiveness of the original formulation, SNMF shows better performance than previous works for classification. Aside from the classification power, SNMF is designed to have several advantages over previous works, including computational efficiency, no parameter tuning, formulation flexibility, and applicability to NMF variants. SNMF also outperforms other subspace learning methods in terms of recognition accuracy and robustness to variations, especially when intra-class variations are not trivial.

Figure 1:
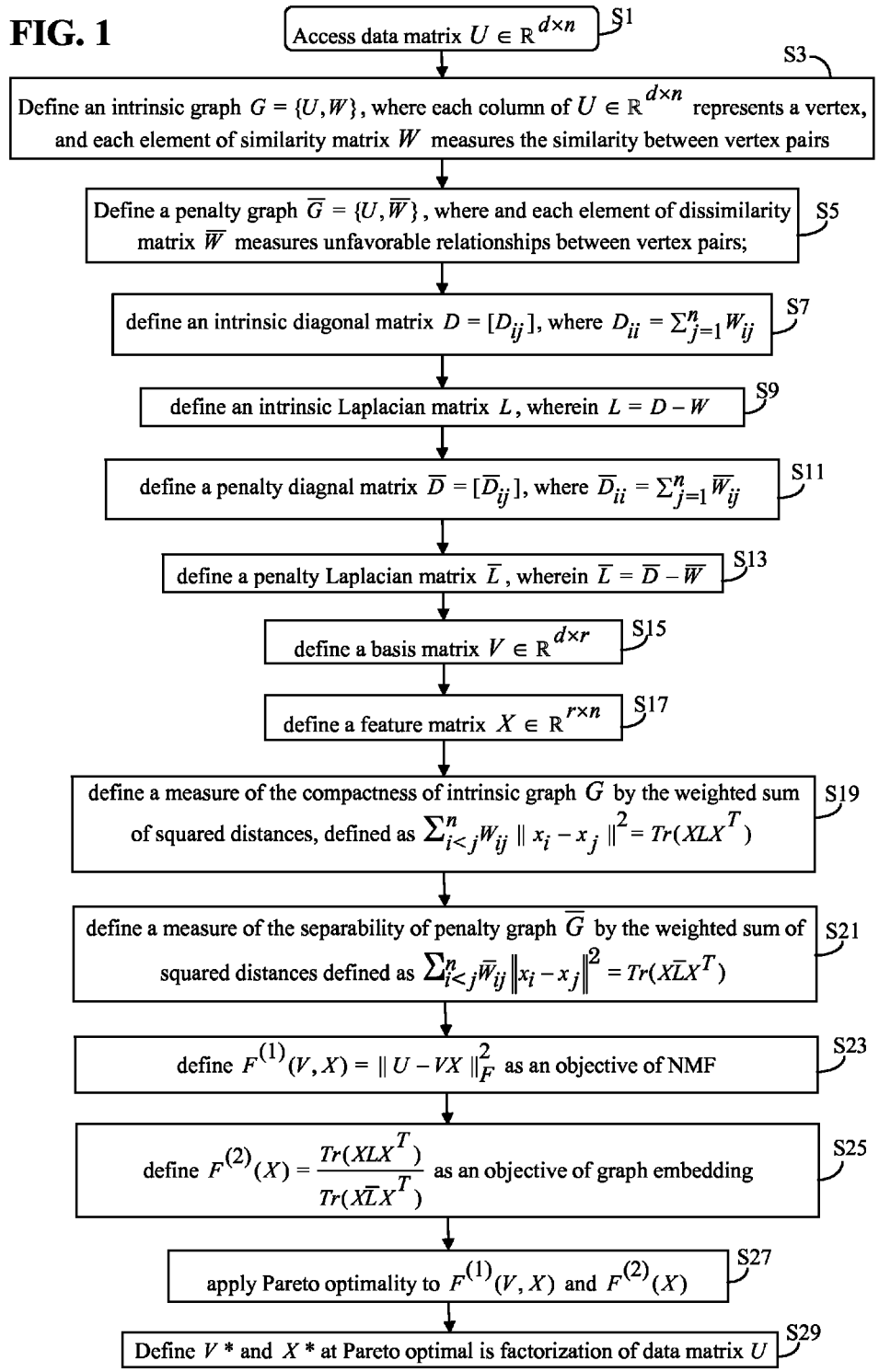
FIG. 1 is a flowchart of a preferred SNMF method.

With reference to FIG. 1, SNMF combines the benefits of non-negative matrix factorization (NMF) and graph embedding, each of which is discussed in turn.

Before describing SNMF, it is beneficial to first provide background information regarding non-negative matrix factorization (NMF) and graph embedding. For completeness, a briefly introduce to non-negative graph embedding (NGE) is also provided since it is currently considered a state-of-the-art approach.

Like NMF, SNMF factorizes a matrix U into the product of two, preferably smaller matrices: a basis matrix V (where V ∈ $\mathbb{R}^{d \times r}$) and a coefficient matrix (or feature matrix) X (where X ∈ $\mathbb{R}^{r \times n}$). For example, matrix U may be a raw data matrix of n samples (or data points) with each sample being of dimension d such that U ∈ $\mathbb{R}^{d \times n}$ (step S1). A specific example of this may be if each of the n columns of U (i.e. each of the n samples) is an image of size d. Matrix U is factorized into the product of a basis matrix V and a feature matrix X by minimizing the following reconstruction error:

$$\min_{V,X} \|U - VX\|_F^2 \qquad (1)$$

s.t. $V_{ik} \geq 0$ and $X_{kj} \geq 0$ $\forall$ $i$, $j$, and $k$

Where $\|\cdot\|_F$ denotes the Frobenius norm. Since Eq. (1) is not a convex function of both V and X, there is no closed form solution for the global optimum. Thus, many researchers have developed iterative update methods to solve the problem. Among them, a popular approach is the multiplicative updates devised by Lee and Seung in "Learning the parts of objects by non-negative matrix factorization", Nature, 401: 788-791, 1999, which is hereby incorporated in its entirety by reference. These multiplicative updates, shown below as equation (2), are popular due to their simplicity.

$$V_{ij} \leftarrow V_{ij} \frac{(UX^T)_{ij}}{(VXX^T)_{ij}}, \; X_{ij} \leftarrow X_{ij} \frac{(V^T U)_{ij}}{(V^T VX)_{ij}} \qquad (2)$$

These updates monotonically decrease the objective function in Eq. (1).

Graph embedding, on the other hand, may be defined as the optimal low dimensional representation that best characterizes the similarity relationships between data pairs. In graph embedding, dimensionality reduction involves two graphs: an intrinsic graph that characterizes favorable relationships among feature vector pairs and a penalty graph that characterizes unfavorable relationships among feature vector pairs. Thus, applying graph embedding to data matrix U would organize its raw data into classes according to specified favorable and unfavorable relationships. To achieve this, however, one first needs to define graph embedding as applied to data matrix U.

For graph embedding, one lets G={U,W} be an intrinsic graph where each column of U ∈ $\mathbb{R}^{d \times n}$ represents a vertex and each element of W measures the similarity between vertex pairs (step S3). In the same way, a penalty graph $\overline{G}$, which measures the unfavorable relationships between vertex pairs may be defined as $\overline{G}$={U,$\overline{W}$} (step S5). In this case, W and $\overline{W}$ can be generated from true relationships among data pairs, such as class labels of data. In addition, the diagonal matrix D=[$D_{ij}$] is defined, where $D_{ij}=\Sigma_{j=1}^n W_{ij}$ (step S7) and the Laplacian matrix L=D−W is defined (step S9). Matrices $\overline{D}$ and $\overline{L}$ are defined from $\overline{W}$ in the same way (steps S11 and S13).

As is explained above, to factorize data matrix U, which is defined as U ∈ $\mathbb{R}^{d \times n}$, one defines a basis matrix V such that V ∈ $\mathbb{R}^{d \times r}$ (step S15), defines a feature matrix X such that X ∈ $\mathbb{R}^{r \times n}$ (step S17), and seeks to populate V and X such that the product of V and X approximates U with minimal error. An object of the present invention, however, is to combine graph embedding with the factorization of matrix U such that the classification properties of graph embedding are incorporated into factorized basis matrix V and a feature matrix X. The present embodiment achieves this by defining the objective of graph embedding in terms of feature matrix X.

First, let each column of feature matrix X be a low dimensional representation of the corresponding column of U. Then, one can measure the compactness of the intrinsic graph G and the separability of the penalty graph $\overline{G}$ by the weighted sum of squared distances of feature matrix X, as follows:

$$\sum_{i<j}^n W_{ij}\|x_i - x_j\|^2 = Tr(XLX^T) \qquad \text{(Step S19)}$$

$$\sum_{i<j}^n \overline{W}_{ij}\|x_i - x_j\|^2 = Tr(X\overline{L}X^T) \qquad \text{(Step S21)}$$

where $x_i$ is the i-th column of X and $x_j$ is j-th column of X.

The objective of graph embedding, as is the case of most dimensionality reduction methods, can be generalized to the following unified framework with specifically defined W and $\overline{W}$.

$$\min \frac{Tr(XLX^T)}{Tr(X\overline{L}X^T)} \qquad (5)$$

As an aside, and before continuing with the discussion of the presently preferred embodiment, it may be useful to address how the prior work of Nonnegative Graph Embedding (NGE) attempts to combine the NMF objective and the graph embedding objective to achieve both the benefits. First, it must be noted that NGE does not adopt the original graph embedding objective of Eq. (5) because it makes NGE's unified optimization problem intractable. Instead, NGE adopts the following transformed formulation.

Suppose that feature matrix X and basis matrix V are divided into two parts as $$X = \begin{bmatrix} X_1 \\ X_2 \end{bmatrix}$$

and V=[$V_1 V_2$]. Here, NGE considers ($X_2$,$V_2$) the complementary space of ($X_1$,$V_1$). Then NGE minimizes $$\min_{V,X} Tr(Q_1 X_1 L X_1^T Q_1^T) + Tr(Q_2 X_2 \overline{L} X_2^T Q_2^T) + \lambda \|U - VX\|_F^2 \qquad (6)$$

s.t. $V \geq 0$ and $X \geq 0$ where $Q_1$ and $Q_2$ are diagonal matrices that consist of the norms of basis vectors in $V_1$ and $V_2$, respectively. These two matrices are multiplied to compensate the norms of bases into coefficient matrices.

Yang et al. argued that NGE minimizes the penalty graph term rather than maximizing it due to the complementary property between $(X_1,V_1)$ and $(X_2,V_2)$. However, it is doubtful whether the complementary space exists without violating the nonnegative constraints. Even if the space exists, NGE provides no assurance that it can discover the complementary space. In fact, experimental results, detailed below, show that NGE does not sufficiently maximize separability of the penalty graph.

Returning now to the present topic of supervised nonnegative matrix factorization (SNMF), the mathematical details of the presently proposed approach of SNMF are first formalized. It is put forth that the present method generates more descriptive features based on the part-based representation of NMF and has several advantages over previous works that were based on a similar idea to that of SNMF. The experimental results, shown below, substantiate this claim.

To acquire both the benefits of part-based representation and the classification power of graph embedding, the present invention addresses both the objectives of NMF and the objective of graph embedding. However, unlike previous works, the present invention directly handles the ratio formation of graph embedding without any transformation. Although it was previously believed that the ratio formulation of graph embedding made its use in NMF intractable, the present approach makes the problem manageable by taking into account the two objectives separately, rather than attempting to manage the weighted sum of them, as is generally proposed in previous works.

For example, the typical way to minimize two objective functions is to minimize their weighted sum with a nonnegative weight. In the present case, the weighted sum of the objectives of NMF and graph embedding would be constructed as follows:

$$F(V, X) = \|U - VX\|_F^2 + q\frac{Tr(XLX^T)}{Tr(X\overline{L}X^T)} \text{ s.t. } V \geq 0 \text{ and } X \geq 0$$

where q is a nonnegative constant that controls the balance of the two objectives.

Since the proposed problem is a multivariate non-convex problem, it is not expected to find global minima. Instead, some techniques that find local minima could would be applied to solve the problem. Among theses techniques, projected gradient methods may be the simplest options to implement.

Projected gradient methods iteratively update (V,X) by the following rule:

$$V_{ij} \leftarrow \max\left(V_{ij} - \alpha\frac{\partial F(V, X)}{\partial V_{ij}}, 0\right)$$

$$X_{ij} \leftarrow \max\left(X_{ij} - \beta\frac{\partial F(V, X)}{\partial X_{ij}}, 0\right)$$

where $\alpha$ and $\beta$ are the step sizes. Various ways of selecting these step sizes are known in the art.

However, since F is not differentiable when $Tr(X\overline{L}X^T)=0$, the updates are not defined at these points. In practice, this problem may be addressed by adding a small number to the denominator of the graph embedding objective.

Furthermore, convergence of the projected gradient method may be slow and sensitive to the step size parameters. Therefore another formulation and optimization scheme is presently preferred.

Herein is presented an approach that handles the objective functions of NMF and graph embedding separately rather than their weighted sum. More formally, the two objectives that are considered are:

$$F^{(1)}(V,X)=\|U-VX\|_F^2 \quad (7)$$

which is based on the nonnegative matrix factorization objective of Eq. (1) (step S23 in FIG. 1), and $$F^{(2)}(X) = \frac{Tr(XLX^T)}{Tr(X\overline{L}X^T)} \quad (8)$$

which is based on the original graph embedding objective of Eq. (5) (step S25).

Before describing the present method of optimizing the objectives of Eqs. (7) and (8), it is helpful to first introduce the concept of Pareto optimality of multiple objectives. Pareto optimality is an important concept in the field of economics, and has been widely used in game theory and social sciences. A Pareto improvement is defined as a change in the status of a system from one status to another that can improve at least one objective without worsening any other objective. The Pareto optimal (or Pareto minimum) is defined as the status where no further Pareto improvements can be obtained. Based on these general definitions, the present approach first provides two Pareto optimal definitions (or equivalently Pareto minimum definitions) of the objectives in Eqns. (7) and (8).

Definition 1: A status updates in basis matrix V and feature matrix X [i.e. a change from a current status (V,X) to a new status (V',X')] is a Pareto improvement if either of the following two conditions is satisfied.

$$F^{(1)}(V',X')<F^{(1)}(V,X) \text{ and } F^{(2)}(V',X')\leq F^{(2)}(V,X) \quad 1)$$

$$F^{(1)}(V',X')\leq F^{(1)}(V,X) \text{ and } F^{(2)}(V',X')<F^{(2)}(V,X) \quad 2)$$

Definition 2: A current status (V*,X*) is a Pareto minimum (i.e. Pareto optimal) if there is no other status (V',X') such that a status-change from (V*,X*) to (V',X') is a Pareto improvement.

SNMF finds a Pareto minimum of the two objectives (as defined by Eq. (7) and (8)) (step S29) by achieving a Pareto improvement in every iteration (step S27). This approach is essentially different from previous approaches, which minimize a weighted sum of the two objectives. That is, The Pareto improvement update approach does not involve even the weight parameter q that controls the balance between the two objectives, which makes the model less flexible. Due to the absence of the weighting parameter and the property of Pareto improvement, the tradeoff between NMF and graph embedding is implicitly made only in the direction where both objectives decrease. In semi-supervised settings, this inflexibility may cause a performance drop because the graph embedding generally needs to be less weighted due to insufficient label information. But in general supervised settings, Applicants have discovered that the updates reliably find an effective solution and can thus be a practical alternative for the projected gradient methods.

The present SNMF approach has several advantages over previous works, especially over NGE.

First, SNMF achieves higher descriptive power due to the effectiveness of the original ratio formulation of graph embedding, as shown in Eq. (8), over a weighed sum approximation, as taught by previous works. This formulation allows SNMF to operate without any additional concepts, such as the concept of complementary space utilized in NGE.

Second, SNMF need not sacrifice the NMF reconstruction error to improve the graph embedding objective, or sacrifice the graph embedding objective to improve the NMF reconstruction error because a Pareto improvement guarantees that both are non-increasing in every iteration. On the other hand, in previous works, it is not guaranteed that both these terms are consistently non-increasing because only their weighted sum is considered.

Third, the suggested optimization problem can be solved through simple multiplicative iterative updates, as will is shown below. Thus, SNMF has a significantly lower computational cost as compared to NGE. It may be noted that another approach known as multiplicative NGE also attempts to reduce the computational cost of NGE, but even compared with multiplicative NGE, the computational cost of SNMF is more economical since SNMF's multiplicative factors are simpler than those of multiplicative NGE. Furthermore unlike multiplicative NGE, SNMF need not compensate the norms of the bases into the coefficient matrix because the ratio formulation automatically prevents the objectives from trivially decreasing when the bases are rescaled.

Fourth, SNMF does not require any parameters since the two objectives of Eqns. (7) and (8) are separately considered. On the other hand, all previous works introduced parameters that must be tuned heuristically or empirically, which is cumbersome and in some cases difficult to be determined appropriately even by empirical validation. For example, NGE requires one to determine two parameters: 1) a weight parameter for balancing the NMF objective and the graph embedding objective; and 2) a size parameter for dividing the basis and coefficient matrices into two parts.

Lastly, SNMF can employ any definitions of similarity and dissimilarity matrices W and $\overline{W}$ (including negative values) if both Tr($XLX^T$) and Tr($X\overline{L}X^T$) are positive. These constraints are reasonable since Tr($XLX^T$) and Tr($X\overline{L}X^T$) are distance measures. By contrast, NGE requires more restricted constraints when defining the matrices. For example, in NGE, all the elements of W and $\overline{W}$ must be nonnegative because negative elements can make the objective of NGE be a non-convex function.

Before describing a detailed implementation of SNMF, a sample definition of W and $\overline{W}$ is provided. A presently preferred embodiment defines W and $\overline{W}$ by borrowing the concept of within-class and between-class distances of Linear Discriminant Analysis (LDA), as is generally described, for example, chapter 5 of book "*Pattern Classification*" by R. O. Duda, P. E. Hart, and D. G. Stork, published by Wiley-interscience, Hoboken, N.J., 2nd edition, 2001, which is hereby incorporated by reference. This approach begins by letting $y_i$ be a class label of the i-th sample and $n_c$ be the size of class c. Matrices W=[$W_{ij}$] and $\overline{W}$=[$\overline{W}_{ij}$] are then defined as $$W_{ij} = \begin{cases} \frac{1}{n_c} & \text{if } y_i, y_j \in c \\ 0 & \text{otherwise} \end{cases}$$

and $$\overline{W}_{ij} = \frac{1}{n} - W_{ij}$$

where n is the total number of data points

Note that the elements of $\overline{W}$ can be negative, which means that NGE cannot use W and $\overline{W}$ from the LDA formulation, as describe immediately above. Not only can SNMF adopt the LDA formulation in order to measure similarities, but other formulations can be adopted as well. For example, for multi-modal data sets, the Marginal Fisher Analysis (MFA) formulation, which effectively reflects local relationships among data can be used. Information on MFA is provided in "Marginal Fisher Analysis and Its Variants For Human Gait Recognition and Content-based Image Retrieval", IEEE Trans on Image Processing, 16(11), 2007, by D. Xu, S. Yan, D. Tao, S. Lin, and H. J. Zhang, which is herein incorporated in its entirety.

A detailed implementation of SNMF now follows.

Figure 2:
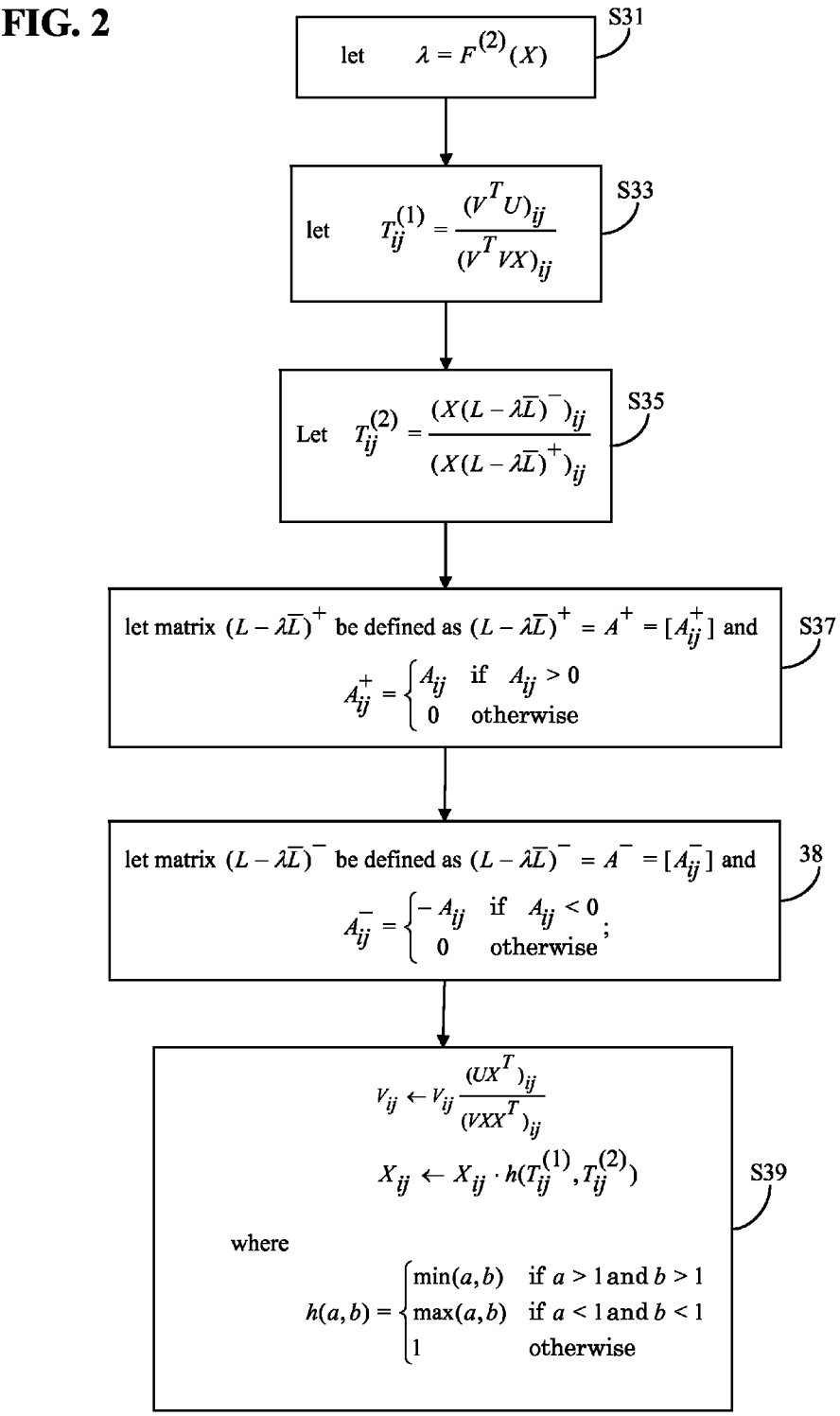
FIG. 2 illustrates multiplicative updates for application of Pareto optimization in accord with FIG. 1.

With reference to FIG. 2, the two SNMF objectives can be optimized by simple multiplicative updates. More formally, a Pareto improvement of $F^{(1)}$ and $F^{(2)}$ (as defined by Eqs. (7) and (8)) can be obtained by the following multiplicative updates: let $\lambda = F^{(2)}(X)$ (step S31) and let $$T_{ij}^{(1)} = \frac{(V^T U)_{ij}}{(V^T V X)_{ij}}$$ (10)

$$T_{ij}^{(2)} = \frac{(X(L-\lambda\overline{L})^-)_{ij}}{(X(L-\lambda\overline{L})^+)_{ij}}$$

(steps S33 and S35). For ease of computation, matrices $(L-\lambda\overline{L})^+$ and $(L-\lambda\overline{L})^-$ may optionally be redefined in one-time steps S37 and S38. In step S37 with $(L-\lambda\overline{L})^+ = A^+ = [A_{ij}^+]$ and in step S38 with $(L-\lambda\overline{L})^- = A^- = [A_{ij}^-]$, $T_{ij}^{(2)}$ is simplified by redefining matrices $(L-\lambda\overline{L})^+$ and $(L-\lambda\overline{L})^-$ as $$A_{ij}^+ = \begin{cases} A_{ij} & \text{if } A_{ij} > 0 \\ 0 & \text{otherwise} \end{cases}$$ (11)

$$A_{ij}^- = \begin{cases} -A_{ij} & \text{if } A_{ij} < 0 \\ 0 & \text{otherwise} \end{cases}$$

A Pareto minimum (i.e. a Pareto optimal) of $F^{(1)}$ and $F^{(2)}$ can be obtained by applying the following multiplicative updates iteratively until the Pareto optimal is reached (step S39).

$$V_{ij} \leftarrow V_{ij} \frac{(UX^T)_{ij}}{(VXX^T)_{ij}}$$ (12)

$$X_{ij} \leftarrow X_{ij} \cdot h(T_{ij}^{(1)}, T_{ij}^{(2)})$$ (13)

where $$h(a, b) = \begin{cases} \min(a, b) & \text{if } a > 1 \text{ and } b > 1 \\ \max(a, b) & \text{if } a < 1 \text{ and } b < 1 \\ 1 & \text{otherwise} \end{cases}$$ (14)

SNMF can be adopted for other NMF variants; e.g., polynomial kernel NMF (as described in "Non-negative Matrix Factorization In Poly-nominal Feature Space", IEEE Trans. On Neural Networks, 19(6):1090-1100, 2008, by I. Bucis, N. Nikolaidis, and I. Pitas, which is herein incorporated its entirety by reference) and kernel NMF (as described in "Non-linear Nonnegative Component Analysis", CVPR, pages 2860-2865, 2009, by S. Zafeiriou and M. Petrou, which is herein incorporated in its entirety by reference). To incorporate other NMF variants with graph embedding, one can combine the updates of the coefficient matrix of the given kernel solution with the graph embedding functionality of $T_{ij}^{(2)}$ from Eq. (10) by means of the multiplicative update factor of graph embedding shown in Eq. (13).

Figure 3A:
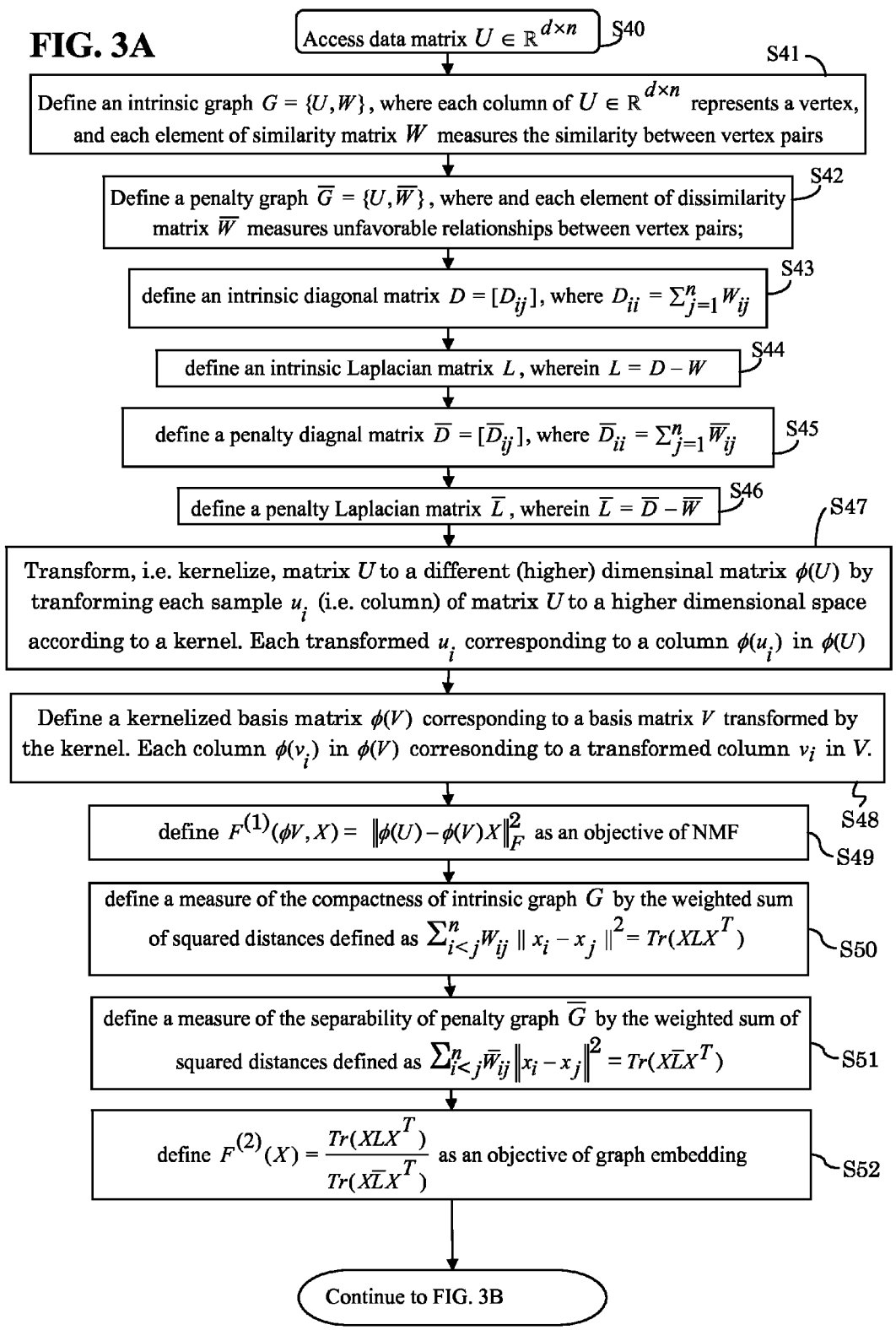

For example, the flow chart of FIGS. 3A and 3B provides a general process for incorporating a kernel transformation into the present invention. The first seven steps in FIG. 3A (steps S40-S40) pertain to defining graph embedding characteristics of matrix U, and are similar to the first seven steps in FIG. 1. After accessing data matrix U (step S40), intrinsic graph G={U,W} and penalty graph $\overline{G}$={U,$\overline{W}$} are defined in steps S41 and S42, respective. As before, each column of U∈ℝ$^{d \times n}$ represents a vertex, each element of similarity matrix W measures the similarity between vertex pairs, and each element of dissimilarity matrix $\overline{W}$ measures unfavorable relationships between vertex pairs.

After defining intrinsic diagonal matrix D=[$D_{ij}$] in step S43

$$\left(\text{where } D_{ii} = \sum_{j=1}^{n} W_{ij}\right),$$

intrinsic Laplacian matrix L is defined as L=D−W in step S44. Similarly after defining penalty diagonal matrix $\overline{D}$=[$\overline{D}_{ij}$] in step S45

$$\left(\text{where } \overline{D}_{ii} = \sum_{j=1}^{n} \overline{W}_{ij}\right),$$

penalty Laplacian matrix $\overline{L}$ is defined as $\overline{L}$=$\overline{D}$−$\overline{W}$ in step S46.

After obtaining the necessary graph embedding information from the original data matrix U, one now turns to the topic of kernel transformation of data matrix U.

In step S47, raw data matrix U is transformed (or kernelized) into a higher (or more generally, a different) dimensional matrix φ(U). As it is known in the art, data matrix U may be kernelized by transforming each sample (i.e. each column) $u_i$ of data matrix U to a higher dimensional space according to a given kernel. Each column of kernelized data matrix φ(U) may then be identified as φ($u_i$).

In step S48, a kernelized basis matrix φ(V) is defined, such as by defining appropriate space in a computer memory. Kernelized basis matrix φ(V) would correspond to a yet to be defined basis matrix V transformed by the kernel. Each column φ($v_i$) in φ(V) would correspond to a transformed column $v_i$ in V.

In step S49, a new NMF objective for kernelized data matrix φ(U) is defined interms of kernelized basis matrix φV and a corresponding, new coefficient matrix X. More specifically, NMF objective $F^{(1)}$(φV,X) is defined as $F^{(1)}$(φV,X)=∥φ(U)−φ(V)X∥$_F^2$.

In order to define an objective of graph embedding that is linked to the new NMF objective for kernelized data matrix φ(U), a relation is defined between intrinsic graph G and the new coefficient matrix X, immediately above, and between a penalty graph $\overline{G}$ and new coefficient matrix X. In step S50, a measure of the compactness of intrinsic graph G is defined by the weighted sum of squared distances defined as $$\sum_{i<j}^{n} W_{ij}\|x_i - x_j\|^2 = Tr(XLX^T).$$

In step S51, a of the separability of penalty graph $\overline{G}$ is defined by the weighted sum of squared distances defined as $$\sum_{i<j}^{n} \overline{W}_{ij}\|x_i - x_j\|^2 = Tr(X\overline{L}X^T).$$

An objective of graph embedding can now be defined as $$F^{(2)}(X) = \frac{Tr(XLX^T)}{Tr(X\overline{L}X^T)}$$

in step S51.

The process then continues to step S53 in FIG. 3B. A new optimization problem for factorizing kernelized data matrix φ(U) is needed. The form of the optimization problem may vary a little depending on whether notation for kernelized basis matrix φ(V) is used directly, or whether φ(V) is defined in terms related to the kernel. Nontheless, the optimziation problem (assuming no graph embedding at this stage) for factorizing kernelized data matrix φ(U) will generally have the following form:

$$\min_{V,X} \|\phi(U) - \phi(V)X\|_F^2$$

$$\text{s.t. } V_{ik} \geq 0 \text{ and } X_{kj} \geq 0$$

$$\forall i, j, \text{ and } k$$

In step S53, a solution in terms of iterative updates is provided for the optimziation problem for the system factorizing kernelized data matrix φ(U) without taking into account any graph embedding issues. The solution to this optimization problem will depend on the kernel used, but it is preferred that it take the form of iterative updates of basis matrix V and new coefficient matrix X. Generally, the iterative updates will take the following form: $V_{ij}$←[$V_{ij}$ multiplied by (η)], and $X_{ij}$←[$X_{ij}$ multiplied by ($T_{ij}^{(1)}$)], or equivalently:

$$V_{ij} \leftarrow V_{ij}(\eta) \text{ and } X_{ij} \leftarrow X_{ij}(T_{ij}^{(1)})$$

where η and $T_{ij}^{(1)}$ the appropriate solution formulations for the above system assuming no graph embedding.

To incorporate graph embedding using the Pareto improvement method described above, one follows the multiplicative update factor of graph embedding shown in Eq. (13). Thus, the substitution λ=$F^{(2)}$(X) is made in step S54 to simplify the definition of $T_{ij}^{(2)}$. In step S56, $T_{ij}^{(2)}$ is defined in terms of X, λ and L, as:

$$T_{ij}^{(2)} = \frac{(X(L-\lambda\overline{L})^-)_{ij}}{(X(L-\lambda\overline{L})^+)_{ij}}.$$

If desired, processing of $T_{ij}^{(2)}$ may be simplified by means of optional steps S57 and S58. In step S57 matrix (L−λ$\overline{L}$)$^+$ is defined as (L−λ$\overline{L}$)$^+$=A$^+$=[$A_{ij}^+$], where $$A_{ij}^+ = \begin{cases} A_{ij} & \text{if } A_{ij} > 0 \\ 0 & \text{otherwise.} \end{cases}$$

In step S58, matrix $(L-\lambda \overline{L})^-$ is defined as $(L-\lambda \overline{L})^-=A^-=[A_{ij}^-]$, where $$A_{ij}^- = \begin{cases} -A_{ij} & \text{if } A_{ij} < 0 \\ 0 & \text{otherwise}. \end{cases}$$

Following Eq. (13) and Eq. (14), the multiplicative updates for a supervised kernel NMF (i.e. for combining the objective of kernel NMF and graph embedding) are (step S59):

$$V_{ij} \leftarrow V_{ij} \cdot (\eta) \text{ and } X_{ij} \leftarrow X_{ij} \cdot h(T_{ij}^{(1)}, T_{ij}^{(2)})$$

where notation h(a,b) means:

$$h(a, b) = \begin{cases} \min(a, b) & \text{if } a > 1 \text{ and } b > 1 \\ \max(a, b) & \text{if } a < 1 \text{ and } b < 1 \\ 1 & \text{otherwise} \end{cases}$$

These updates are applied iteratively until the the Pareto optimal is reached, i.e. until a stationary point is reached.

Having discussed a general process for incorporating a kernel transformation into the present SMNF process, two specific examples of kernel transformation are now presented.

With reference to FIG. 4, the first example illustrates the incorporation of a polynomial kernel into the present SNMF process to create a supervised polynomial kernel NMF. In FIG. 4, steps S40 to S50 are the same as those of FIG. 3A, and are described above. From step S50, the process proceeds to step S71.

Assuming no graph embedding, polynomial kernel NMF factorizes kernelized data matrix $\phi(U)$ into the product of a kernelized basis matrix $\phi(V)$ and coefficient matrix (or feature matrix) X by minimizing the reconstruction error defined as $$\min_{V,X} \|\phi(U) - \phi(V)X\|_F^2 \text{ s.t. } V_{ik} \geq 0 \text{ and } X_{kj} \geq 0 \; \forall \, i, j, \text{ and } k$$

where $\|\cdot\|_F$ denotes the Frobenius norm.

In step S71, like in step S53 of FIG. 3B, a solution to the optimization problem assuming no graph embedding is provided. Bucis et al., mentioned above, propose the following iterative update as a solution to the optimization problem.

$$V_{ij} \leftarrow V_{ij} \left( \frac{(UK'^{(UV)})_{ij}}{(V\Omega K'^{(VV)})_{ij}} \right), \quad X_{ij} \leftarrow X_{ij} \left( \frac{K_{ij}^{(VU)}}{(K^{(VV)}X)_{ij}} \right)$$

where $K^{(VU)}$ is a kernel matrix whose (i,j) element is $\phi(v_i) \cdot \phi(u_j) = (v_i \cdot u_j)^d$ when the degree of the polynomial kernel is d. In the same way, $K_{ij}^{(VV)} = \phi(v_i) \cdot \phi(v_j) = (v_i \cdot v_j)^d$. K' denotes the matrix containing the values of the derivative of the polynomial kernel function. More specifically, $K'^{(UV)}_{ij} = d \cdot (u_i \cdot v_j)^{d-1}$ and $K'^{(VV)}_{ij} = d \cdot (v_i \cdot v_j)^{d-1}$. $\Omega$ is a diagonal matrix whose diagonal elements are $$\omega_{ii} = \sum_{j=1}^{n} X_{ij}.$$

In terms of notation $\eta$ and $T_{ij}^{(1)}$ from step S53 of FIG. 3B, in step S71, $$\eta = \frac{(UK'^{(UV)})_{ij}}{(V\Omega K'^{(VV)})_{ij}} \text{ and } T_{ij}^{(1)} = \frac{K_{ij}^{(VU)}}{(K^{(VV)}X)_{ij}}.$$

Thus in step S73, $T_{ij}^{(1)}$ is defined as $$T_{ij}^{(1)} = \frac{K_{ij}^{(VU)}}{(K^{(VV)}X)_{ij}},$$

and in step S75, $T_{ij}^{(2)}$ is defined as $$T_{ij}^{(2)} = \frac{(X(L - \lambda \overline{L})^-)_{ij}}{(X(L - \lambda \overline{L})^+)_{ij}}.$$

If desired, steps S56 and S58 of FIG. 3B may be optionally included to simplify processing of $T_{ij}^{(2)}$.

Based on the concept of Pareto improvement, the graph embedding formulation can be incorporated with polynomial kernel NMF. As a result, one obtains the following multiplicative updates for supervised polynomial kernel NMF (step S77).

$$V_{ij} \leftarrow V_{ij} \cdot \left( \frac{(UK'^{(UV)})_{ij}}{(V\Omega K'^{(VV)})_{ij}} \right), \quad X_{ij} \leftarrow X_{ij} \cdot h\left( \frac{K_{ij}^{(VU)}}{(K^{(VV)}X)_{ij}}, T_{ij}^{(2)} \right)$$

These updates are applied iteratively until the Pareto optimal is reached.

With reference to FIG. 5, the second example turns to the subject of a supervised kernel NMF. Like in the case of the example of FIG. 4, the supervised kernel NMF process of FIG. 5 assumes the execution of steps S40-S52 of FIG. 3A, and the process flows from step S52 to step S81. The objective of step S81, as is the case in step S53 of FIG. 3B, is to define iterative updates to solve the optimization problem defined by $F^{(1)}(\phi V, X)$, assuming no graph embedding at this stage.

Kernel NMF enables a wide variety of kernels to be used in raw data matrix decomposition. One way to formulate kernel NMF is to assume that every kernelized $\phi(v_j)$ can be written as linear combination of all the elements of $\phi(U)$, defined as $$\phi(v_j) = \sum_{i=1}^{n} Z_{ij} \phi(u_i)$$

where $Z_{ij}$ is a weight applied to $\phi(u_i)$. Thus, Z is a combination of weights applied to $\phi(U)$ to create $\phi(V)$. Stated differently, $\phi(V) = \phi(U)Z$. Substituting $\phi(U)Z$ for $\phi(V)$ in the optimization problem defined by $F^{(1)}(\phi V, X)$, one obtains the following optimization problem, assuming no graph embedding at this point, $$\min_{Z,X} \|\phi(U) - \phi(U)ZX\|_F^2 \text{ s.t. } Z_{ik} \geq 0 \text{ and } X_{kj} \geq 0 \; \forall \, i, j \text{ and } k$$

where $\|\cdot\|_F$ denotes the Frobenius norm (step S81). According to Zafeiriou et al, mentioned above, the following update rules guarantee that the reformulated objective function remains nonincreasing.

$$Z_{ij} \leftarrow Z_{ij} \square \left( \frac{(K^{(UU)}X)_{ij}}{(K^{(UU)}ZXX^T)_{ij}} \right), \quad X_{ij} \leftarrow X_{ij} \square \left( \frac{(Z^T K^{(UU)})_{ij}}{(Z^T K^{(XX)}ZX)_{ij}} \right)$$

where $K^{(UU)}$ is a kernel matrix whose (i,j) element is $\phi(u_i) \cdot \phi(u_j) = (u_i \cdot u_j)^d$, and d is the degree of the polynomial kernel, and where $K_{ij}^{(XX)} = \phi(x_i) \cdot \phi(x_j) = (x_i \cdot x_j)^d$, and d is the degree of the polynomial kernel.

In terms of notation $\eta$ and $T_{ij}^{(1)}$ from step S53 of FIG. 3B, in step S81, $$\eta = \frac{(UK'^{(UV)})_{ij}}{(V\Omega K'^{(VV)})_{ij}} \text{ and } T_{ij}^{(1)} = \frac{K_{ij}^{(VU)}}{(K^{(VV)}X)_{ij}}$$

In step S83, $T_{ij}^{(1)}$ is therefore defined as $$\frac{(Z^T K^{(UU)})_{ij}}{(Z^T K^{(XX)}ZX)_{ij}},$$

and in step S85, $T_{ij}^{(2)}$ is defined as $$\frac{(X(L-\lambda \overline{L})^-)_{ij}}{(X(L-\lambda \overline{L})^+)_{ij}}.$$

The multiplicative updates for supervised kernel NMF incorporating graph embedding are provided in step S87, as:

$$Z_{ij} \leftarrow Z_{ij} \cdot \left( \frac{(K^{(UU)}X)_{ij}}{(K^{(UU)}ZXX^T)_{ij}} \right), X_{ij} \leftarrow X_{ij} \cdot h \left( \frac{(Z^T K^{(UU)})_{ij}}{(Z^T K^{(XX)}ZX)_{ij}}, T_{ij}^{(2)} \right)$$

Like before, these updates are applied until a stationary point, i.e. the Pareto optimal, is reached.

Now the topic of convergence analysis is discussed. First it may be noted that in their seminal work, Lee and Seung, mentioned above, did not prove that the limit point obtained by the multiplicative updates is a local optimum. This convergence issue has been analyzed and resolved by Lin, as described in his paper, "On the Convergence of Multiplicative Update Algorithms For Non-negative Matrix Factorization", IEEE Transactions on Neural Networks, 18:1589-1596, 2007, which is herein incorporated in its entirety by reference. Lin achieves this by adding a small non-zero quantity to the denominators of the updates. If desired, the limit point obtained by the updates of SNMF in accord with the present invention can be shown to be a Pareto minimum by the same method.

Returning to the subject of convergence analysis, it is helpful to first reintroduce the concept of the auxiliary function, which is used by numerous researchers in the community, and to provided a few definitions, lemmas, proofs, and theorems, as follows:

Definition 3: G(x,x') is an auxiliary function for F(x) if the two following conditions are satisfied.

$$G(x,x') \geq F(x), G(x,x) = F(x) \quad (15)$$

This definition is useful with the following Lemma.

Lemma 1: If G(x,x') is an auxiliary function, then F(x) is non-increasing under the update of G(x,x') such that $G(x,x') \leq G(x^t,x^t)$.

Proof: $F(x^{t+1}) \leq G(x^{t+1},x^t) \leq G(x^t,x^t) \leq F(x^t)$

Since only $F^{(1)}$ includes basis matrix V, a Pareto improvement on $F^{(1)}$ and $F^{(2)}$ can be accomplished by the update of V in Eq. (12) when X is fixed, unless a Pareto minimal is already achieved. Thus, the next step is to show that Eq. (13) also performs a Pareto improvement of X when V is fixed, unless a Pareto minimal is already achieved.

Lemma 2: $F^{(1)}$ is non-increasing under the following update rule when V is fixed.

$$X_{ij} \leftarrow X_{ij} \cdot h(T_{ij}^{(1)}, a) \quad (16)$$

where a is an arbitrary number. If $X_{ij}$ is changed by this update, i.e., if $X_{ij} \neq 0$ and $h(T_{ij}^{(1)},a) \neq 1$, then $F^{(1)}$ is decreasing.

Proof: The following update is considered first:

$$X_{ij} \leftarrow X_{ij} T_{ij}^{(1)} \quad (17)$$

This is the update of normal NMF. Since $F^{(1)}$ is the objective of normal NMF, $F^{(1)}$ is non-increasing under this update. And, if $X_{ij} \neq 0$ and $T_{ij}^{(1)} \neq 1$, then $F^{(1)}$ is decreasing.

Let $X^{(ij)}(x)$ be a matrix X whose (i,j) element is replaced with x. Then, for any $0 \leq c \leq 1$, $$F^{(1)}(V, X) = (1-c)F^{(1)}(V, X) + cF^{(1)}(V, X) \geq \quad (18)$$
$$(1-c)F^{(1)}(V, X) + cF^{(1)}(V, X^{(ij)}(X_{ij}T_{ij}^{(1)}))$$

Since $F^{(1)}(V,X)$ is a convex function of $X_{ij}$, $$F^{(1)}(V, X) \geq F^{(1)}(V, (1-c)X + cX^{(ij)}(X_{ij}T_{ij}^{(1)})) = \quad (19)$$
$$F^{(1)}(V, X^{(ij)}((1-c)X_{ij} + cX_{ij}T_i^{(1)})) =$$
$$F^{(1)}(V, X^{(ij)}(X_{ij}(1-c+cT_{ij}^{(1)})))$$

Let $z = 1-c+cT_{ij}^{(1)}$. If $T_{ij}^{(1)} > 1$, z can be any value between 1 and $T_{ij}^{(1)}$. Similarly, if $T_{ij}^{(1)} < 1$, z can be any value between $T_{ij}^{(1)}$ and 1. If $T_{ij}^{(1)} = 1$, then z=1. Therefore, $F^{(1)}$ is non-increasing under the update rule $$X_{ij} \leftarrow X_{ij} z \quad (20)$$

for any z such that $$\begin{cases} 1 \leq z \leq T_{ij}^{(1)} & \text{if } T_{ij}^{(1)} > 1 \\ T_{ij}^{(1)} \leq z \leq 1 & \text{if } T_{ij}^{(1)} < 1 \\ 1 & \text{otherwise} \end{cases} \quad (21)$$

This update rule is equivalent to the update in Eq. (16).

Both the equalities in Eqns. (18) and (19) hold only if $X_{ij} = 0$ or $T_{ij}^{(1)} = 1$ or c=0. Thus, if $X_{ij} \neq 0$ and $z \neq 1$, which is equivalent to $h(T_{ij}^{(1)}, \alpha) \neq 1$, the inequalities are strict and $F^{(1)}$ is decreasing.

Before moving on to $F^{(2)}$, an idea of where $T_{ij}^{(2)}$ in Eq. (10) is derived from is provided. To do so, one defines $$K(X) = Tr(XLX^T) - \lambda Tr(X\overline{L}X^T) \quad (22)$$

which is obtained by transforming $F^{(2)}$ into the difference form. This K plays an auxiliary role in the proof on $F^{(2)}$. Now suppose that $\lambda$ is an arbitrary number.

In order to integrate the non-negative constraints into K, one can set $\Phi = [\Phi_{ij}]$ as a Lagrange multiplier matrix, in which $\Phi_{ij}$ is the Lagrange multiplier for the constraint $X_{ij} \geq 0$. Then the Lagrange $\mathcal{L}$ for K is defined as $$\mathcal{L} = Tr(XLX^T) - \lambda Tr(X\overline{L}X^T) + Tr(\Phi X^T) \quad (23)$$

By setting the derivative of $\mathcal{L}$ to zero, one obtains $$\frac{\partial \mathcal{L}}{\partial X} = 2XL - 2\lambda X\overline{L} + \Phi = 0 \quad (24)$$

Along with KKT condition of $\Phi_{ij}X_{ij}=0$ described in "Nonlinear programming", Proceedings of 2nd Berkeley Symposium, 1951, by H. Kuhn and A. Tucker, and herein incorporated in its entirety by reference, $$2(XL)_{ij}X_{ij} - 2(X\overline{L})_{ij}X_{ij} + \Phi_{ij}X_{ij} = 2(X(L-\lambda\overline{L})^+)_{ij}X_{ij} - 2(X(L-\lambda\overline{L})^-)_{ij}X_{ij} = 0 \quad (25)$$

From this equation, one can obtain the following update.

$$X_{ij} \leftarrow X_{ij} \frac{(X(L-\lambda\overline{L})^-)_{ij}}{(X(L-\lambda\overline{L})^+)_{ij}} = X_{ij}T_{ij}^{(2)} \quad (26)$$

Lemma 3: K is non-increasing under the following update rule.

$$X_{ij} \leftarrow X_{ij}T_{ij}^{(2)} \quad (27)$$

Proof: The first order and second order derivatives of K with respect to $X_{ij}$ are respectively computed as $$\frac{\partial K}{\partial X_{ij}} = 2(X(L-\lambda\overline{L}))_{ij}, \quad \frac{\partial^2 K}{\partial X_{ij}^2} = 2(L-\lambda\overline{L})_{jj} \quad (28)$$

Let $K^{(ij)}$ be a function obtained by isolating $X_{ij}$ term from K. Then, one can define G as an auxiliary function of $K^{(ij)}$ by replacing the second order derivative in the Taylor series expansion of $K^{(ij)}$.

$$G(X_{ij}, X_{ij}^t) = K^{(ij)}(X_{ij}^t) + \frac{\partial K}{\partial X_{ij}}\bigg|_{X_{ij}=X_{ij}^t}(X_{ij} - X_{ij}^t) + \frac{(X^t(L-\lambda\overline{L})^+)_{ij}}{X_{ij}^t}(X_{ij} - X_{ij}^t)^2 \quad (29)$$

To verify that G is an auxiliary function of K, one needs to show $$G(X_{ij}, X_{ij}^t) - K^{(ij)}(X_{ij}) = \left(\frac{(X^t(L-\lambda\overline{L})^+)_{ij}}{X_{ij}^t} - (L-\lambda\overline{L})_{jj}\right)(X_{ij} - X_{ij}^t)^2 \geq 0 \quad (30)$$

which is equivalent to $$(X^t(L-\lambda\overline{L})^+)_{ij} - X_{ij}^t(L-\lambda\overline{L})_{jj} \geq 0 \quad (31)$$

This inequality is satisfied because $$(X^t(L-\lambda\overline{L})^+)_{ij} = \sum_{k=1}^n X_{ik}^t(L-\lambda\overline{L})_{kj}^+ \geq X_{ij}^t(L-\lambda\overline{L})_{jj}^+ \geq X_{ij}^t(L-\lambda\overline{L})_{jj} \quad (32)$$

$G(X_{ij}, X_{ij}^t)$ is convex; thus, solving $$\frac{\partial G(X_{ij}, X_{ij}^t)}{\partial X_{ij}} = 0$$

yields $X_{ij}^{t+1}$ by Lemma 1.

$$X_{ij}^{t+1} = X_{ij}^t \frac{(X^t(L-\lambda\overline{L})^+)_{ij} - (X^t(L-\lambda\overline{L}))_{ij}}{(X^t(L-\lambda\overline{L})^+)_{ij}} \quad (33)$$

$$= X_{ij}^t \frac{(X^t(L-\lambda\overline{L})^-)_{ij}}{(X^t(L-\lambda\overline{L})^+)_{ij}}$$

$$= X_{ij}^t T_{ij}^{(2)}$$

Since G is an auxiliary function of K, K is also non-increasing under this update.

Lemma 4: K is non-increasing under the following update rule.

$$X_{ij} \leftarrow X_{ij} \cdot h(T_{ij}^{(2)}, b) \quad (34)$$

where b is an arbitrary number. If $X_{ij}$ is changed by this update, i.e., if $X_{ij} \neq 0$ and $h(T_{ij}^{(2)}, b) \neq 1$, then K is decreasing.

Proof: Let $X_{ij}^{t+1} = X_{ij}^t T_{ij}^{(2)}$. Then, for any $0 \leq c \leq 1$, $$G(X_{ij}^t, X_{ij}^t) = (1-c)G(X_{ij}^t, X_{ij}^t) + cG(X_{ij}^t, X_{ij}^t) \geq (1-c)G(X_{ij}^t, X_{ij}^t) + cG(X_{ij}^{t+1}, X_{ij}^t) \quad (35)$$

Since $G(X_{ij}, X_{ij}^t)$ is convex, $$G(X_{ij}^t, X_{ij}^t) \geq G((1-c)X_{ij}^t + cX_{ij}^{t+1}, X_{ij}^t) \quad (36)$$

$$= G((1-c)X_{ij}^t + cX_{ij}^t T_{ij}^{(2)}, X_{ij}^t)$$

$$= G(X_{ij}^t(1-c+cT_{ij}^{(2)}), X_{ij}^t)$$

Let $z = 1-c+cT_{ij}^{(2)}$. In the same way as in Lemma 2, one can show that $G(X_{ij}, X_{ij}^t)$ is non-increasing under the update rule $$X_{ij} \leftarrow X_{ij}z \quad (37)$$

for any z such that $$\begin{cases} 1 \leq z \leq T_{ij}^{(2)} & \text{if } T_{ij}^{(2)} > 1 \\ T_{ij}^{(2)} \leq z \leq 1 & \text{if } T_{ij}^{(2)} < 1 \\ 1 & \text{otherwise} \end{cases} \quad (38)$$

This update rule is equivalent to the update in Eq. (34). Since G is an auxiliary function of K, K is also non-increasing under the update in Eq. (34) by Lemma 1. In the same way as in Lemma 2, one can show that the inequalities in Eqns. (35) and (36) are strict if $X_{ij} \neq 0$ and $h(T_{ij}^{(2)}, b) \neq 1$ Lemma 5: $F^{(2)}$ is non-increasing under the update in Eq. (34) if $$\lambda = F^{(2)}(X^t) = \frac{Tr(X^t L X^{tT})}{Tr(X^t \overline{L} X^{tT})} \quad (39)$$

at iteration t. If $X_{ij}$ is changed under the update, then $F^{(2)}$ is decreasing.

Proof: Suppose that $X_{ij}^{t+1}$ is obtained from $X_{ij}^t$ by applying the update in Eq. (34); i.e., $X_{ij}^{t+1} = X_{ij}^t \cdot h(T_{ij}^{(2)}, b)$. Since K(X) is non-increasing under the update in Eq. (34), $$Tr(X^{t+1}LX^{t+1^T}) - \lambda Tr(X^{t+1}\overline{L}X^{t+1^T}) = K(X^{t+1}) \leq K(X^t) = 0 \quad (40)$$

One ensures that $Tr(X\overline{L}X^T i)$ is always positive; thus, $$F^{(2)}(X^{t+1}) = \frac{Tr(X^{t+1}LX^{t+1^T})}{Tr(X^{t+1}\overline{L}X^{t+1^T})} \leq \lambda = F^{(2)}(X^t) \quad (41)$$

If $X_{ij}$ is changed, the inequality in Eq. (40) is strict so that the inequality in Eq. (41) is also strict.

Theorem 1: A Pareto improvement on $F^{(1)}$ and $F^{(2)}$ can be achieved by the update rules in Eqns. (10) to (14) unless a Pareto minimal is already achieved.

Proof: By Lemmas 2 and 5, either $F^{(1)}$ or $F^{(2)}$ is decreasing under the update rule in Eqns. (10) to (14) unless X and V are at a stationary point which is a Pareto minimum of $F^{(1)}$ and $F^{(2)}$.

The above described method of SNMF, which, as is illustrated below, is well suited for data classification, may be implemented in various types of data processing hardware.

Figure 6:
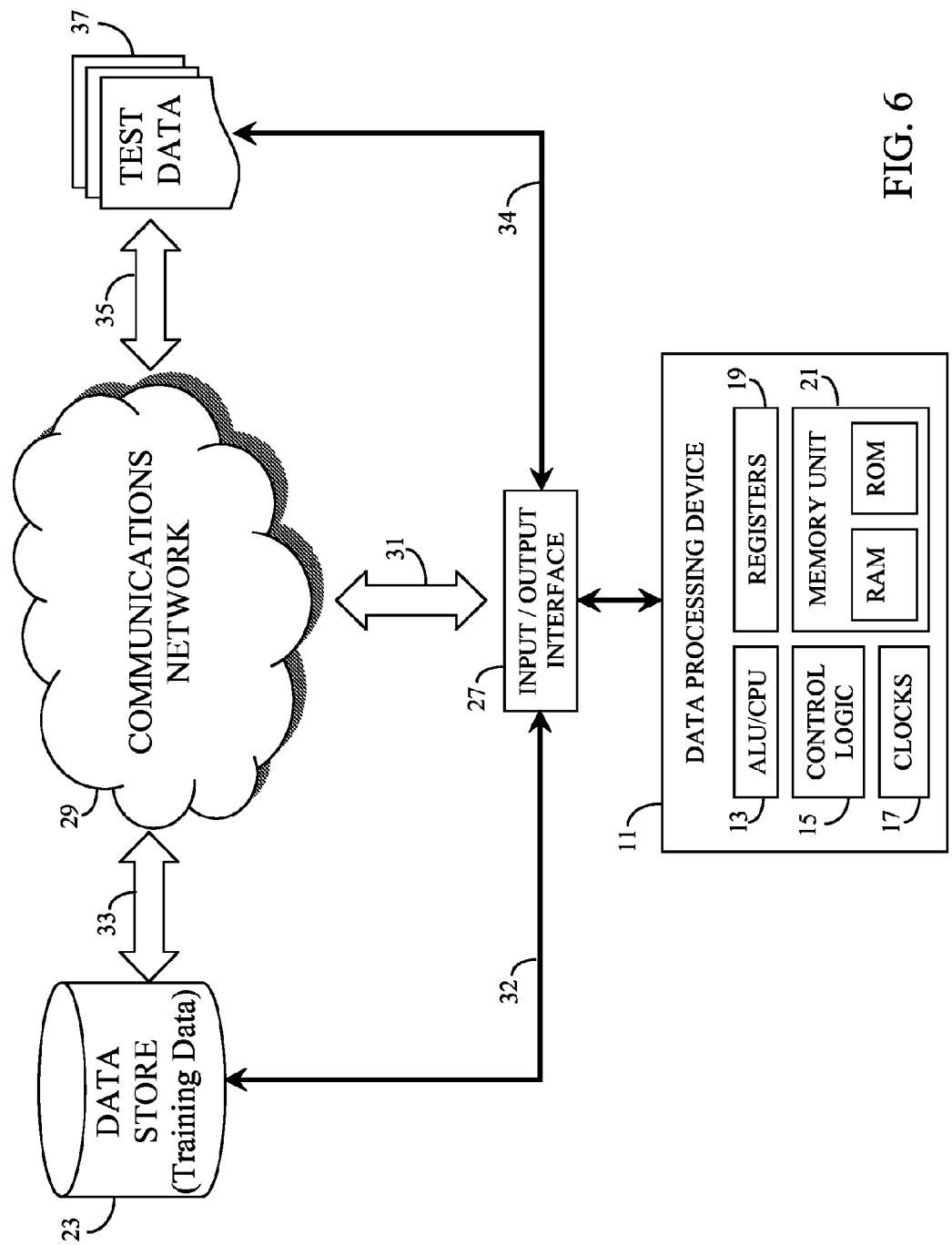
FIG. 6 shows exemplary hardware for implementing the present invention.

With reference to FIG. 6, a general example of such data processing hardware includes a data processing device 11. As it is known in the art, data processing device 11 may be a micro-computer, a central processing unit (CPU), a specialized image processor, a programmable logic device (PLD), a complex programmable logic device (CPLD), an application specific integrated circuit (ASIC), or other computing device. In general, data processing device 11 may include an arithmetic logic unit (ALU) or CPU 13, control logic 15, various timing clocks 17, various types of registers 19 (including data registers, shift registers, workspace registers, status registers, address registers, interrupt registers, instruction registers, program counters, etc.), and a memory unit 21 (including RAM and/or ROM).

In the present example of FIG. 6, raw data matrix U of n samples, which may consist of training data when used for data classification or catergorization, may be maintain in a data store 23. Data processing device 11 may directly access data store 23 via a direct link 32 and appropriate input/output interface 27, or may alternatively access data store 23 via communication links 31/33 and network 29, which may be a LAN, WLAN, or the Internet.

Similarly, test data 37, which is the data that is to be classified, may be accessible via a direct link 34 or through communication network 29 and communication links 31/35. It is to be understood that test data 37 may be an archive of data (such as a store of face images) or may be generated in real time (such as face images created by surveillance cameras). It is further to be understood that communication links 31-35 may be wired or wireless communication links.

In the following section, the presently preferred embodiment is evaluated using three standard face databases in public use in the field: the FERET database, the JAFFE database, and the AR database.

The FERET database contains 420 images of 70 people. For each subject person, six frontal-view images are provided.

The JAFFE database contains 213 images of 10 Japanese female subjects. For each subject, 3 or 4 samples for each of 7 basic facial expressions are provided.

The AR database contains 4000 images of 126 people, including 70 men and 56 women, and provides frontal-view images with different facial expressions, illumination conditions, and natural occlusions for each person.

For evaluation purposes, once the face region is cropped, each image is down-sampled to 32×32 pixels for the FERET and AR databases, and down-sampled to 40×30 pixels for the JAFFE database. Following the typical approach of previous works, three images from each person in the FERET database, 150 images from the JAFFE database, and seven images from each person of the AR database are randomly selected as a training set (i.e. training data), and the rest are utilized as a test set (i.e. test data).

To test the effectiveness of the present SNMF approach, SNMF is compared with seven other popular subspace learning algorithms: Principal Component Analysis (PCA), Independent Component Analysis (ICA), Nonnegative Matrix Factorization (NMF), Localized NMF (LNMF), Linear Discriminant Analysis (LDA), Marginal Fisher Analysis (MFA), and Nonnegative Graph Embedding (NGE). For NGE, the multiplicative updates proposed in "Multiplicative Nonnegative Graph Embedding", CVPR, 2009, by Wang et al., are implemented, and the parameter for balancing the NMF part and the graph embedding part is set to 1, as is suggested in "Non-negative Graph Embedding", CVPR, 2008, by Yang et al.

For MFA and NGE, the protocol described in "Marginal Fisher Analysis and Its Variants For Human Gait Recognition and Content-based Image Retrieval", IEEE Trans on Image Processing, 16(11), 2007, by Xu et al. is followed to build the intrinsic graph and the penalty graph.

For classification, as is conventional, the 1-Nearest Neighbor classifier (1-NN) is used because of its computational efficiency. After testing 10 times, the mean and the standard deviation of the classification accuracies are reported. A sufficient number of dimensions that nearly cover all possible dimensions of the embedding space are explored, and the best performance is reported.

Figures 7, 8:
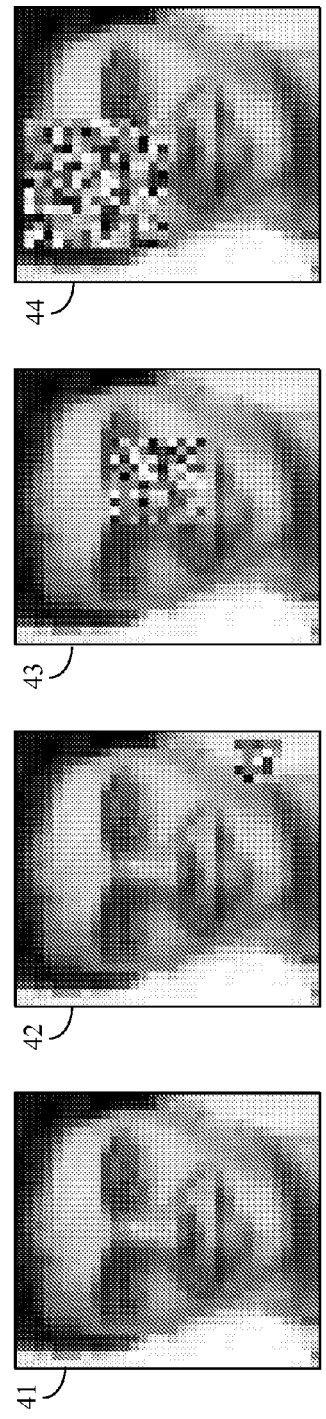
FIG. 7 shows Table 1 summarizing a comparison of the recognition properties of the present invention (SNMF) versus various other recognition methods known in the art.
FIG. 8 shows examples of three sizes of synthetic occlusions placed on a reference image.

With reference to Table 1 in FIG. 7, the classification capability of the present SNMF approach is compared with the above-noted seven subspace learning algorithms, as applied to the FERET and JAFFE databases. Performance for SNMF exceeds both the classical dimension reduction methods (PCA and ICA) as well as NMF variants (NMF, LNMF, and NGE). In particular, SNMF outperforms NGE although the two approaches are developed from the similar idea, which indicates the formulation of SNMF generates more discriminative features than NGE.

Superior performance of SNMF as compared to other supervised methods, namely LDA and MFA, can be attributed to the fact that SNMF minimizes the reconstruction error while utilizing label information. In this respect, SNMF has both the advantages of unsupervised representation approaches and supervised classification approaches. LDA performs comparable to present SNMF method on FERET and JAFFE databases; however, LDA is not robust to variations, as shown below. MFA also reports slightly less accuracy than SNMF on JAFFE, but the performance gap between the two approaches is significant on the FERET database. MFA tends to over reduce the dimension of data during its preprocessing step to avoid singular value issues when the number of training samples is small relatively to the number of classes. Compared to LDA and MFA, the present approach reliably demonstrates the best performance.

In another exemplary application of the present invention, synthetic patches (i.e. occlusions regions that hide a region of an image) are placed on the original images from FERET and JAFFE database. The patch pixel sizes are one of 5×5, 10×10, and 15×15, and the patch locations are randomly chosen. For each of patch sizes, recognition accuracies after 10 tests were computed.

Figure 9A:
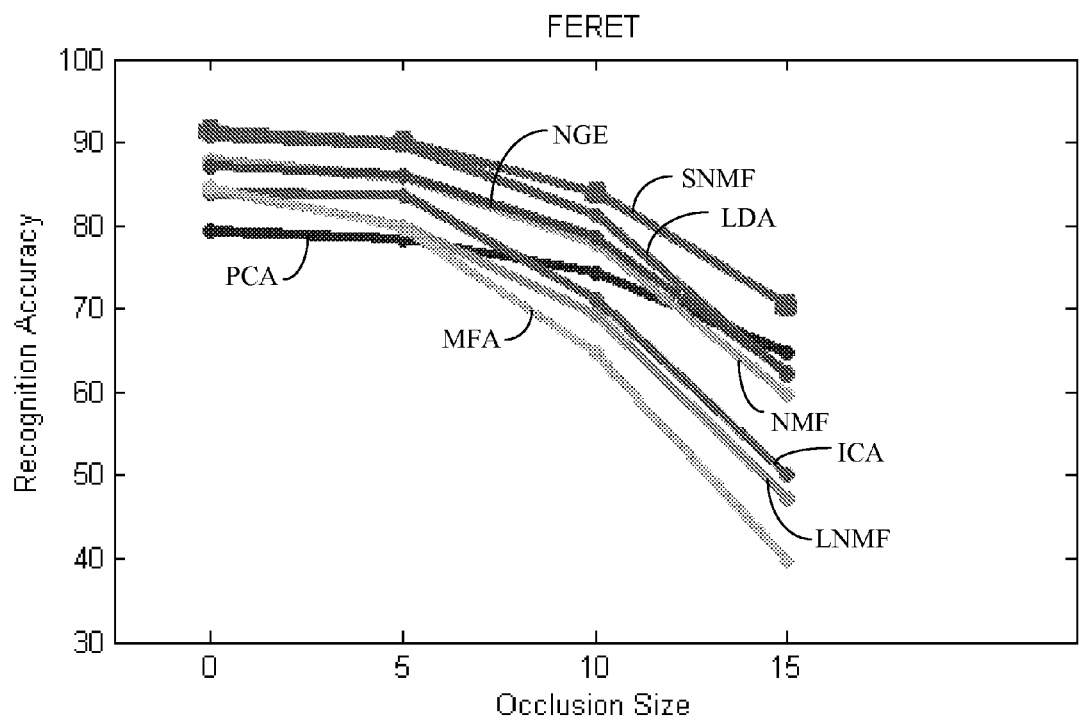
FIG. 9A compares the results of the present invention versus various known recognition methods applied to the FERRET database with the synthetic occlusions of FIG. 8.
Figure 9B:
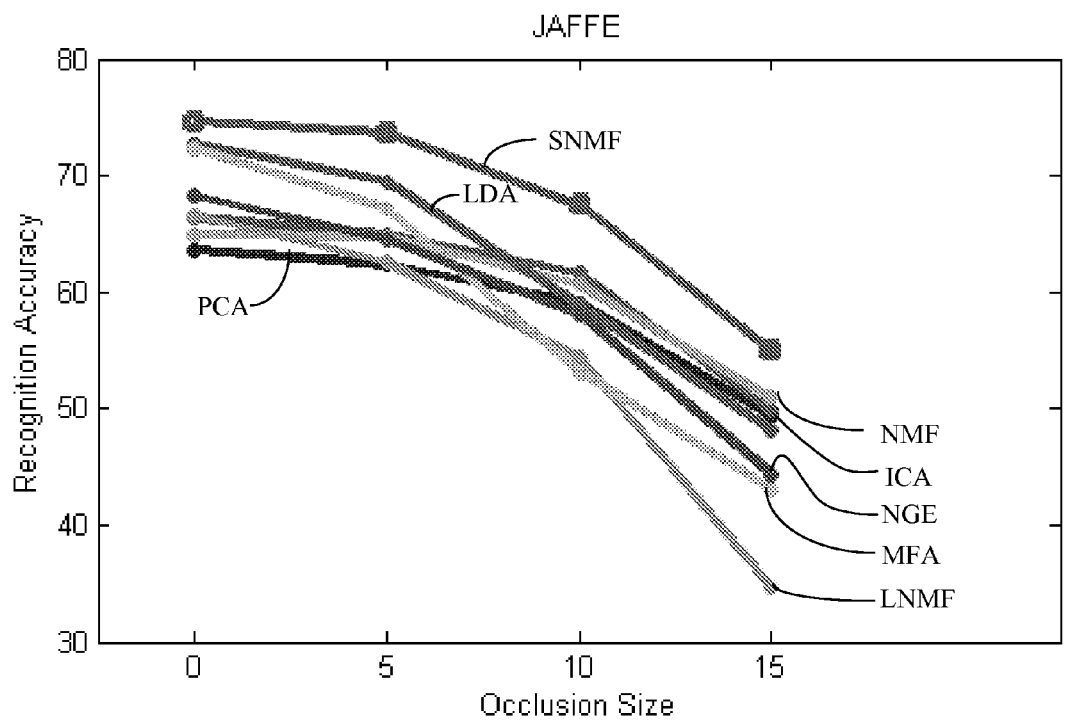
FIG. 9B shows compares the results of the present invention versus various known recognition methods applied to the JAFFE database with the synthetic occlusions of FIG. 8.

For example, FIG. 8 shows four sample images 41-44 from the FERET database with three of the four images having synthetic occlusions. The leftmost image 41 is the original image. From second left to right, the occlusion sizes are 5×5 pixels for image 42, 10×10 pixels for image 43, and 15×15 pixels for image 44. The locations of occlusions are randomly selected The results for FERRET database are shown in the plot of FIG. 9A, and the results for the JAFFE database are shown in plot of FIG. 9B. As can be seen, SNMF constantly dominates the other approaches. The greater the occlusion sizes are, the clearer the performance gaps between SNMF and the other methods are. Of particular interest is the performance of LDA which is comparable to SNMF in the case of no occlusion, but drops drastically with growing occlusion size.

Although SNMF is robust to synthetic occlusions, the result does not necessarily imply that the algorithm is robust to natural variations in real world situations. The AR database is used to investigate how SNMF performs with natural variations. The AR database is selected since it contains various real world variations, such as different facial expressions, illumination conditions, and natural occlusions. Sample images of the AR database are illustrated in FIG. 10.

Figures 10, 11:
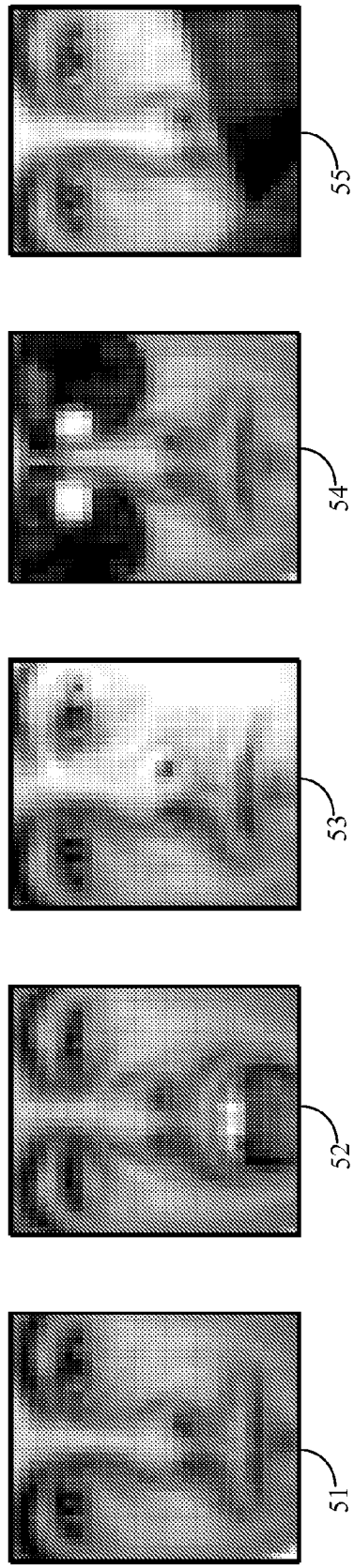
FIG. 10 illustrates five sample images with natural variations provided by the AR database.
FIG. 11 shows Table 2, which compares the present invention to various recognition methods known in the art when applied to the AR database.

As is illustrated in the sample images of the AR database shown in FIG. 10, the AR database provides reference subject (51) and also provides different facial expressions (52), illumination conditions (53), and natural occlusions (54 and 55) of the same subject.

Face recognition accuracies (%) on the AR database are shown in Table 2 of FIG. 11. After testing 10 times, the mean and the standard deviation of the 10 accuracies are reported.

As can be seen in Table 2, SNMF outperforms the other techniques for the AR database as well, which implies that SNMF can be successfully applied to real world problems. LDA performs much worse than SNMF on the AR database due to the large variations within the same class. SNMF clearly outperforms NGE as well. Based on the experimental results, it is put forth that the complementary space idea does not effectively maximize separability of the penalty graph when within-class variation is large, as evident in the AR database. In such a case, NGE jumbles up features from different classes while minimizing compactness of the intrinsic graph.

It is further put forth that SNMF shows more discriminating power and robustness to variations because SNMF not only produces generally sparse bases, but also ignores uninformative details based on class labels. In this respect, the bases of SNMF are meaningfully sparse.

Figure 12:
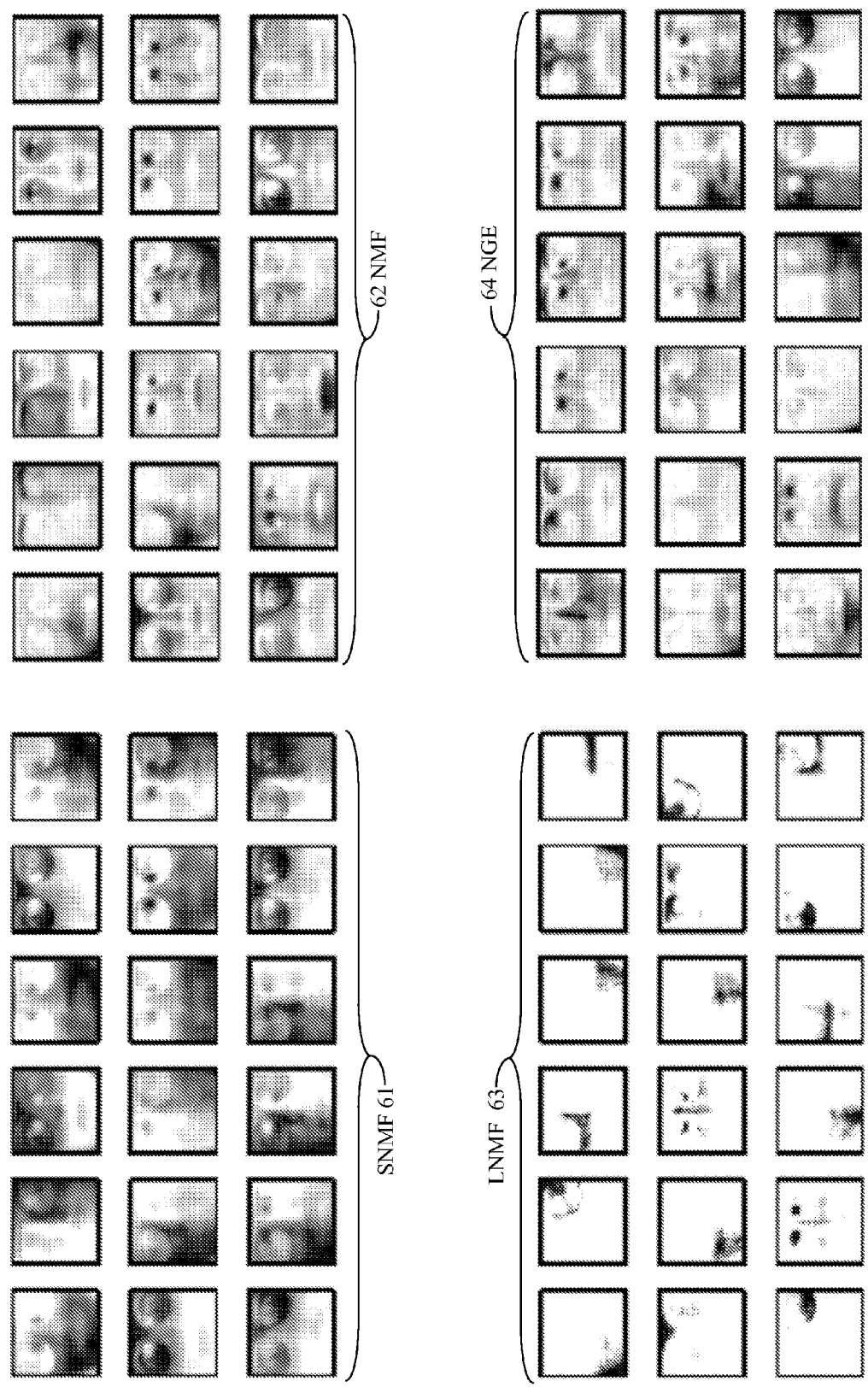
FIG. 12 shows the basis images of SNMF (61), NMF (62), LNMF (63), and NGE (64) for the AR database

For illustrative purposes, FIG. 12 shows the basis images of SNMF (61), NMF (62), LNMF (63), and NGE (64) for the AR database. The basis images of SNMF 61 describe less details than those of NMF 62 and NGE 64 since SNMF effectively excludes meaningless details. Although the basis images of LNMF 63 are sparser, they do not contain meaningful local components.

SNMF also has advantages on localization. In the basis images of SNMF 61, one can more clearly see each face component and variation: e.g., eyes vs. mouth regions, sunglasses, scarves, and illumination changes. SNMF automatically assigns more basis images to describe more informative parts by minimizing both the reconstruction error and the noise/signal ratio.

In this work, concept of SNMF, which generates a descriptive part-based representation of data, based on the concept of NMF aided by the discriminative idea of graph embedding is proposed. An iterative procedure which optimizes the suggested formulation based on Pareto optimization is presented. The formulation presented in this work removes the dependence on combined optimization schemes, which can be divergent without proper parameter tuning. The analytical and empirical evidence show that SNMF has advantages over popular subspace learning techniques as well as the state-of-the-art in the relevant field. We believe that the idea of SNMF can be successfully applied to other application domains, such as spam filtering and gene expression discovery. We leave the experimental validation as future work. Another future direction is to develop faster algorithms of SNMF based on recently proposed faster NMF algorithms.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A data discrimination method for processing data within a data matrix U file, comprising:
   (a) providing a data processing device implementing the following step:
   (b) accessing a kernel;
   (c) accessing said data matrix U from a data store, wherein data matrix U is defined as $U \in \mathbb{R}^{d \times n}$, where $\mathbb{R}$ is the set of real numbers, d×n define the dimensions of data matrix U, and data matrix U is substantially factorable into a basis matrix V and a coefficient matrix X;
   (d) defining an intrinsic graph G, wherein G={U,W}, each column of U represents a vertex, W is a similarity matrix, and each element of similarity matrix W is a measure of defined favorable relationships between vertex pairs;
   (e) defining a penalty graph $\overline{G}$, wherein $\overline{G}=\{U,\overline{W}\}$, $\overline{W}$ is a dissimilarity matrix, and each element of dissimilarity matrix $\overline{W}$ is a measure of defined unfavorable relationships between vertex pairs;
   (f) defining an intrinsic diagonal matrix D, wherein $D=[D_{ij}]$ and
   $$D_{ii} = \sum_{j=1}^{n} W_{ij};$$
   (g) defining an intrinsic Laplacian matrix L, wherein L=D−W;
   (h) defining a penalty diagonal matrix $\overline{D}$, wherein $\overline{D}=[\overline{D}_{ij}]$ and
   $$\overline{D}_{ii} = \sum_{j=1}^{n} \overline{W}_{ij};$$
   (i) defining a penalty Laplacian matrix $\overline{L}$, wherein $\overline{L}=\overline{D}-\overline{W}$;
   (j) using said kernel to transform, i.e. kernelize, data matrix U to a different dimensional matrix φ(U) by tranforming each column $u_i$ of data matrix U to a different dimensional space according to said kernel, wherein each transformed column $u_i$ defines a corresponding column $\phi(u_i)$ in different dimensional matrix $\phi(U)$;

(k) defining a kernelized basis matrix $\phi(V)$ corresponding to basis matrix V transformed by said kernel, each column $\phi(v_i)$ in kernalized basis matrix $\phi(V)$ corresponding to a transformed column $v_i$ in basis matrix V;

(l) defining $F^{(1)}(\phi V, X) = \|\phi(U) - \phi(V)X\|_F^2$ as an objective of non-negative matrix factorization, i.e. NMF;

(m) defining a measure of the compactness of intrinsic graph G by the weighted sum of squared distances defined as $$\sum_{i<j}^{n} W_{ij} \|x_i - x_j\|^2 = Tr(XLX^T);$$

(n) defining a measure of the separability of penalty graph $\overline{G}$ by the weighted sum of squared distances defined as $$\sum_{i<j}^{n} \overline{W}_{ij} \|x_i - x_j\|^2 = Tr(X\overline{L}X^T);$$

(o) defining $$F^{(2)}(X) = \frac{Tr(XLX^T)}{Tr(X\overline{L}X^T)}$$

as an objective of graph embedding;

(p) defining iterative updates of basis matrix V and coefficient matrix X to solve an optimization problem define by $F^{(1)}(\phi V, X)$ assuming no graph embedding, said optimization problem having the form $$\min_{V,X} \|\phi(U) - \phi(V)X\|_F^2 \text{ s.t. } V_{ik} \geq 0 \text{ and } X_{kj} \geq 0 \forall i, j, \text{ and } k$$

and said iterative updates having the form $V_{ij} \leftarrow V_{ij}$ multiplied by ($\eta$) and $X_{ij} \leftarrow X_{ij}$ multiplied by($T_{ij}^{(1)}$), where and $\eta$ and $T_{ij}^{(1)}$ represent solution formulations for the system with no graph embedding;

(q) defining $\lambda = F^{(2)}(X)$;

(r) defining $$T_{ij}^{(2)} = \frac{(X(L-\lambda \overline{L})^-)_{ij}}{(X(L-\lambda \overline{L})^+)_{ij}};$$

and (s) applying the following iterative multiplicative updates until a Pareto optimal is reached $$V_{ij} \leftarrow V_{ij} \cdot (\eta) \text{ and } X_{ij} \leftarrow X_{ij} \cdot h(T_{ij}^{(1)}, T_{ij}^{(2)})$$

where $h(T_{ij}^{(1)}, T_{ij}^{(2)}) = \begin{cases} \min(T_{ij}^{(1)}, T_{ij}^{(2)}) & \text{if } T_{ij}^{(1)} > 1 \text{ and } T_{ij}^{(2)} > 1 \\ \max(T_{ij}^{(1)}, T_{ij}^{(2)}) & \text{if } T_{ij}^{(1)} < 1 \text{ and } T_{ij}^{(2)} < 1 \\ 1 & \text{otherwise} \end{cases}$ and wherein:

$V_{ij} \leftarrow V_{ij} \cdot (\eta)$ is a first objective;

$X_{ij} \leftarrow X_{ij} \cdot h(T_{ij}^{(1)}, T_{ij}^{(2)})$ is a second objective;

said Pareto optimal is the iterative status where no further Pareto improvement can be obtained, and a Pareto improvement is defined as an iterative update that improves at least one of said first and second objectives without orsenin the other.

2. The method of claim 1, wherein step (r) includes the following sub-steps:

defining matrix $(L-\lambda \overline{L})^+$ as $(L-\lambda \overline{L})^+ = A^+ = [A_{ij}^+]$, where $$A_{ij}^+ = \begin{cases} A_{ij} & \text{if } A_{ij} > 0 \\ 0 & \text{otherwise;} \end{cases}$$

and defining matrix $(L-\lambda \overline{L})^-$ as $(L-\lambda \overline{L})^- = A^- = [A_{ij}^-]$, where $$A_{ij}^- = \begin{cases} -A_{ij} & \text{if } A_{ij} < 0 \\ 0 & \text{otherwise.} \end{cases}$$

3. The method of claim 1, wherein said different dimensional matrix $\phi(U)$ is of higher dimension than said data matrix U.

4. The method of claim 1, wherein said kernel is a polynomial kernel, and in step (p), $$\eta = \frac{(UK'^{(UV)})_{ij}}{(V\Omega K'^{(VV)})_{ij}} \text{ and}$$

$$T_{ij}^{(1)} = \frac{K_{ij}^{(VU)}}{(K^{(VV)}X)_{ij}}$$

where:

$K^{(VU)}$ is a kernel matrix whose (i,j) element is $\phi(v_i) \cdot \phi(u_j) = (v_i \cdot u_j)^d$, where d is the degree of the polynomial kernel, $K_{ij}^{(VV)} = \phi(v_i) \cdot \phi(v_j) = (v_i \cdot v_j)^d$, where d is the degree of the polynomial kernel, K' denotes the matrix containing the values of the derivative of the polynomial kernel function, such that $K'_{ij}^{(UV)} = d \cdot (u_i \cdot v_j)^{d-1}$ and $K'_{ij}^{(VV)} = d \cdot (v_i \cdot v_j)^{d-1}$, and $\Omega$ is a diagonal matrix whose diagonal elements are $$\omega_{ii} = \sum_{j=1}^{n} X_{ij}.$$

5. The method of claim 1, wherein:

in step (p), every $\phi(v_j)$ is defined as a linear combination of all the elements of $\phi(U)$ defined as $$\phi(v_j) = \sum_{i=1}^{n} Z_{ij} \phi(u_i),$$

where $Z_{ij}$ is a weight applied to $\phi(u_i)$, and Z is a combination of weights applied to $\phi(U)$ to define $\phi(V)$ according to $\phi(V) = \phi(U)Z$;

optimization problem $$\min_{V,X} \|\phi(U) - \phi(V)X\|_F^2$$

is made to incorporate the substitution $\phi(V)=\phi(U)Z$, and is reformulated as $$\min_{Z,X} \|\phi(U) - \phi(U)ZX\|_F^2 \text{ s.t. } Z_{ik} \geq 0 \text{ and } X_{kj} \geq 0$$

$\forall\ i,\ j,$ and $k$ where $\|\cdot\|_F$ denotes the Frobenius norm; and
using the reformulated optimization problem, $\eta$ and $T_{ij}^{(1)}$ are redefined as:

$$Z_{ij} \leftarrow Z_{ij}(\eta),\ X_{ij} \leftarrow X_{ij}(\mu)$$

where $$\eta = \left(\frac{(K^{(UU)}X)}{(K^{(UU)}ZXX^T)_{ij}}\right) \text{ and } T_{ij}^{(1)} = \left(\frac{(Z^T K^{(UU)})_{ij}}{(Z^T K^{(XX)}ZX)_{ij}}\right)$$

where $K^{(UU)}$ is a kernel matrix whose (i,j) element is $\phi(u_i)\cdot\phi(u_j)=(u_i\cdot u_j)^d$, and d is the degree of the polynomial kernel, and where $K_{ij}^{(XX)}=\phi(x_i)\cdot\phi(x_j)=(x_i\cdot x_j)^d$, and
in step (s), the substitution $\phi(V)=\phi(U)Z$ is incorporated into said iterative multiplicative updates, redefining them as:

$$Z_{ij} \leftarrow Z_{ij} \cdot \left(\frac{(K^{(UU)}X)_{ij}}{(K^{(UU)}ZXX^T)_{ij}}\right),\ X_{ij} \leftarrow X_{ij}\cdot h(T_{ij}^{(1)}, T_{ij}^{(2)}) \text{ where}$$

$$h(a,b) = \begin{cases} \min(a,b) & \text{if } a > 1 \text{ and } b > 1 \\ \max(a,b) & \text{if } a < 1 \text{ and } b < 1 \\ 1 & \text{otherwise.} \end{cases}$$

6. The method of claim 1, wherein data matrix U is comprised of n samples and each column of U represents a sample.

7. The method of claim 6, wherein each of said samples is an image file.

8. The method of claim 1, wherein W and $\overline{W}$ are generated from true relationships among data pairs.

9. The method of claim 8, wherein said data pairs are class labels of data.

10. The method of claim 1, wherein the ratio formation of $F^{(2)}(X)$ is handled without any transformation.

11. The method of claim 1, wherein at least one of similarity matrix W or dissimilarlty matrix $\overline{W}$ has negative values.

12. The method claim 1, wherein $\text{Tr}(XLX^T)$ and $\text{Tr}(X\overline{L}X^T)$ are positive.

13. The method claim 1, wherein said Pareto optimality is applied directly on said ratio formulation of $F^{(2)}(X)$ in the absence of any weighed sum approximation.

14. The method of claim 1, wherein the Pareto optimal is found through a series of Pareto improvement status update iterations defined as a change from a current status (V, X) to a new status (V', X') that achieves a Pareto improvement until said Pareto optimal is achieved, and a status update is a Pareto improvement if either of the following two conditions is satisfied:

$F^{(1)}(V',X')<F^{(1)}(V,X)$ and $F^{(2)}(V',X')\leq F^{(2)}(V,X)$     1)

$F^{(1)}(V',X')\leq F^{(1)}(V,X)$ and $F^{(2)}(V',X')<F^{(2)}(V,X)$     2)

and wherein
a current status is a Pareto optimal (V*,X*) if there is no other status (V',X') such that a status update iteration from (V*,X*) to (V',X') is a Pareto improvement.

15. The method of claim 1, wherein said Pareto optimal is achieved when the iterative multiplicative updates reach a stationary point.

16. The method of claim 1, wherein similarity matrix W and dissimilarity matrix $\overline{W}$ are defined by the concept of within-class and between-class distances of Linear Discriminant Analysis (LDA).

17. The method of claim 16, wherein:
similarity matrix $W=[W_{ij}]$ is defined as:

$$W_{ij} = \begin{cases} \frac{1}{n_c} & \text{if } y_i, y_j \in c \\ 0 & \text{otherwise} \end{cases}$$

wherein $y_i$ is a class label of the i-th sample, $y_j$ is a class label of the j-th sample, and $n_c$ is the size of class c; and
dissimilarity matrix $\overline{W}=[\overline{W}_{ij}]$ is defined as $$\overline{W}_{ij} = \frac{1}{n} - W_{ij}$$

wherein n is the number of data points.

18. A method of classifying test data, comprising:
arranging a set of training data into data matrix U;
applying the method of claim 1 to data matrix U to identify a coefficient matrix X* at the Pareto optimal state; and
classifying said test data only according to the classification defined by X*.

\* \* \* \* \*